(12) United States Patent
Taquet et al.

(10) Patent No.: US 12,531,992 B2
(45) Date of Patent: Jan. 20, 2026

(54) METHOD AND APPARATUS OF ENCODING/DECODING A SLICE OF POINT CLOUD DATA

(71) Applicant: Beijing Xiaomi Mobile Software Co., Ltd., Beijing (CN)

(72) Inventors: Jonathan Taquet, Beijing (CN); Sebastien Lasserre, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 6 days.

(21) Appl. No.: 18/833,124

(22) PCT Filed: Dec. 13, 2022

(86) PCT No.: PCT/CN2022/138730
§ 371 (c)(1),
(2) Date: Jul. 25, 2024

(87) PCT Pub. No.: WO2023/147742
PCT Pub. Date: Aug. 10, 2023

(65) Prior Publication Data
US 2025/0113033 A1     Apr. 3, 2025

(30) Foreign Application Priority Data
Feb. 1, 2022    (EP) .................................. 22305112

(51) Int. Cl.
*H04N 19/13* (2014.01)
*G06T 9/00* (2006.01)
*H04N 19/174* (2014.01)
*H04N 19/91* (2014.01)

(52) U.S. Cl.
CPC ............. *H04N 19/13* (2014.11); *G06T 9/001* (2013.01); *H04N 19/174* (2014.11); *H04N 19/91* (2014.11)

(58) Field of Classification Search
CPC ...... H04N 19/174; H04N 19/13; H04N 19/91; G06T 9/001
See application file for complete search history.

(56) References Cited

U.S. PATENT DOCUMENTS

| | | | |
|---|---|---|---|
| 2021/0029355 A1* | 1/2021 | Zhu | H04N 19/96 |
| 2021/0167795 A1* | 6/2021 | Lasserre | H03M 7/6076 |
| 2022/0394284 A1* | 12/2022 | Wang | H04N 19/70 |
| 2024/0104784 A1* | 3/2024 | Zhang | H04N 19/13 |

* cited by examiner

*Primary Examiner* — Zhubing Ren
(74) *Attorney, Agent, or Firm* — Finnegan, Henderson, Farabow, Garrett & Dunner, L.L.P.

(57) ABSTRACT

A method of encoding a slice of point cloud data into a bitstream, includes: obtaining a previous coding state represented by at least one coding parameter value, apart from data representative of a content of an entry of an entropy context table, used to previously encoding point cloud data; initializing a current coding state from the previous coding state, the current coding state being represented by at least one current coding parameter; encoding a slice of point cloud data into a bitstream based on the current coding state; updating the current coding state during the encoding of the slice of point cloud data according to encoded point cloud data obtained by encoding the slice of point cloud data; and preserving the current coding state during and/or at the end of the encoding of the slice of point cloud data.

20 Claims, 10 Drawing Sheets

METHOD AND APPARATUS OF ENCODING/DECODING A SLICE OF POINT CLOUD DATA

CROSS-REFERENCE TO RELATED APPLICATION

This application is the U.S. National Stage Application of International Application No. PCT/CN2022/138730, filed on Dec. 13, 2022, which is based on and claims priority to European Patent Application No. 22305112.9 filed on Feb. 1, 2022, the entire contents of both of which are incorporated herein by reference.

FIELD

The present application generally relates to point cloud compression and, in particular to methods and apparatus of encoding/decoding a slice of point cloud data.

BACKGROUND

As a format for the representation of 3D data, point clouds have recently gained traction as they are versatile in their capability in representing all types of physical objects or scenes. Point clouds may have from thousands to up to billions of points for cartography applications. In many applications, compression of the point clouds is a key point in order to make the distribution chain of many immersive worlds practical. However, the compression in the related art has problems of poor efficiency and long latency.

SUMMARY

According to a first aspect of the present application, there is provided a method of encoding a slice of point cloud data into a bitstream comprising context-based entropy encoding the slice of point cloud data based on entropy context tables, wherein the method comprises obtaining a previous coding state represented by at least one coding parameter value, apart from data representative of a content of an entry of one of the entropy context tables, used to previously encode point cloud data; initializing a current coding state from said previous coding state, said current coding state being represented by at least one current coding parameter; encoding the slice of point cloud data into the bitstream based on the current coding state; updating the current coding state during the encoding of the slice of point cloud data according to encoded point cloud data obtained by encoding the slice of point cloud data; and preserving the current coding state during and/or at the end of the encoding of the slice of point cloud data.

According to a second aspect of the present application, there is provided a method of decoding a slice of point cloud data from a bitstream comprising context-based entropy decoding the slice of point cloud data based on entropy context tables, wherein the method comprises obtaining a previous coding state represented by at least one coding parameter value, apart from data representative of a content of an entry of one of the entropy context tables, used to previously decode point cloud data; initializing a current coding state from said previous coding state, said current coding state being represented by at least one current coding parameter; decoding the slice of point cloud data from the bitstream based on the current coding state; updating the current coding state during the decoding of the slice of point cloud data according to decoded point cloud data obtained by decoding the slice of point cloud data; and preserving the current coding state during and/or at the end of the encoding of the slice of point cloud data.

According to an eighth aspect of the present application, there is provided a non-transitory storage medium carrying instructions of program code for executing a method according to the first aspect of the present application.

BRIEF DESCRIPTION OF THE DRAWINGS

Reference will now be made, by way of example, to the accompanying drawings which show embodiments of the present application, and in which.

Similar reference numerals may have been used in different figures to denote similar components.

DETAILED DESCRIPTION

Figure 1:
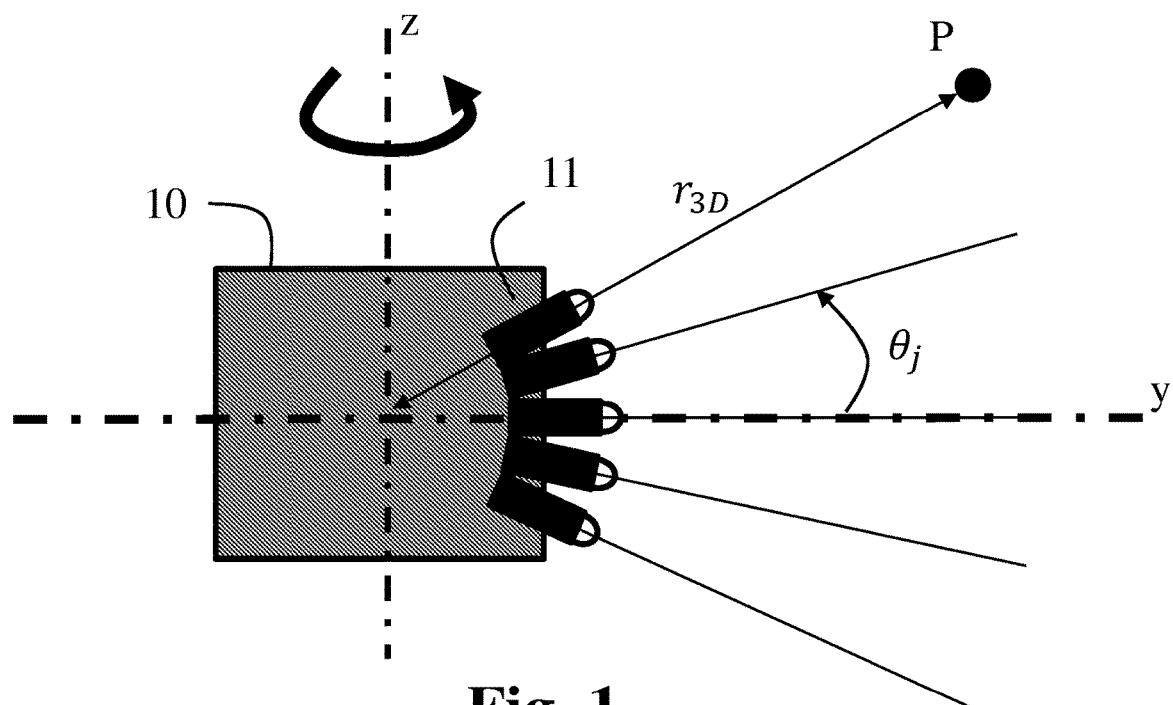
FIG. 1 shows schematically a side view of a sensor head and some of its parameters in accordance with an embodiment of the present application.

At least one of the embodiments is described more fully hereinafter with reference to the accompanying figures, in which examples of at least one of the embodiments are depicted. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the scope of the present application.

The present section is intended to introduce the reader to various aspects of art, which may be related to various aspects of at least one embodiments of the present application that is described and/or claimed below. This discussion is believed to be helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allow for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

Depending on the use cases, points clouds may have from thousands to up to billions of points for cartography applications. Raw representations of point clouds require a very high number of bits per point, with at least a dozen of bits per cartesian coordinate x, y or z, and optionally more bits for attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, has initiated work items on point cloud compression. This has led to two standards, namely MPEG-I part 5 (ISO/IEC 23090-5) or Video-based Point Cloud Compression (aka V-PCC) MPEG-I part 9 (ISO/IEC 23090-9) or Geometry-based Point Cloud Compression (aka G-PCC)

An important use case is the transmission of sparse geometry data sensed by at least one sensor mounted on a moving vehicle. This usually requires a simple and low latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to spinning Lidar-sensed sparse geometry data have been already exploited in G-PCC and have led to very significant gains of compression.

Figure 2:
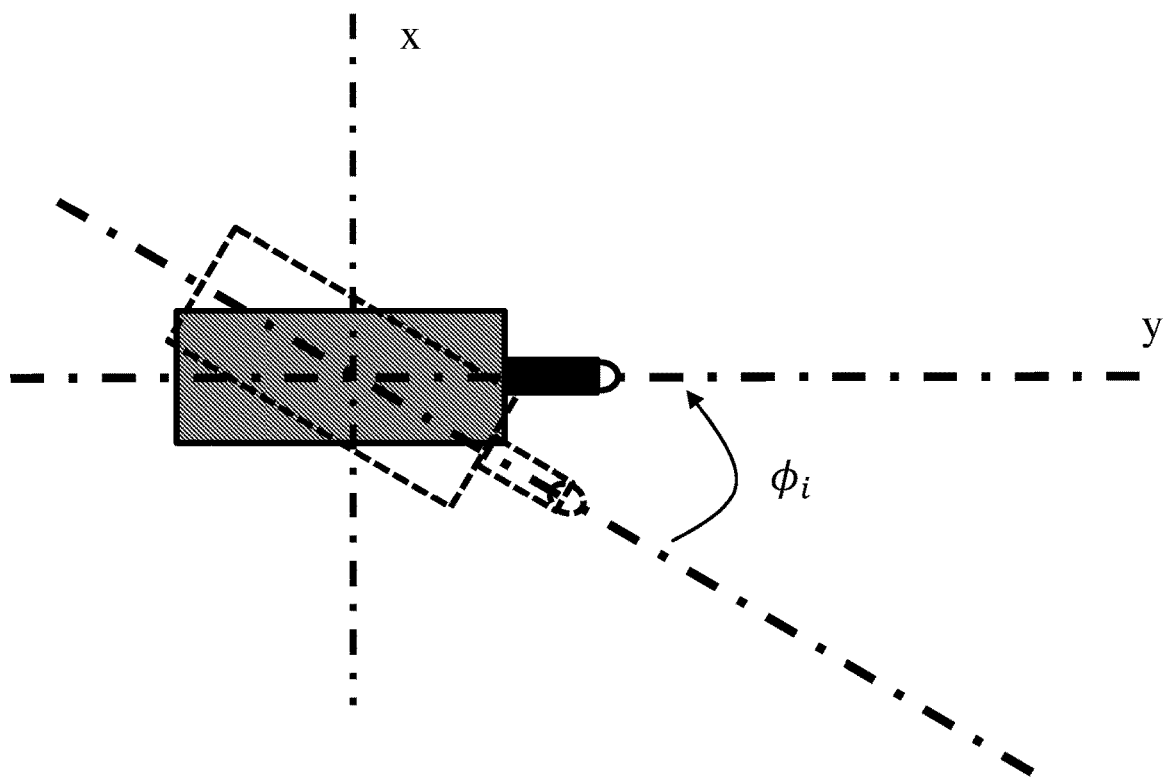
FIG. 2 shows schematically a top view of the sensor head and some of its parameters in accordance with an embodiment of the present application.

First, G-PCC exploits the elevation angle (relative to the horizontal ground) of sensing from a spinning Lidar head 10 as depicted on FIGS. 1 and 2. A Lidar head 10 comprises a set of sensors 11 (for example lasers), here five sensors are represented. The spinning Lidar head 10 may spin around a vertical axis z to sense geometry data of a physical object. Lidar-sensed geometry data is then represented in spherical coordinates $(r_{3D}, \phi, \theta)$, where $r_{3D}$ is the distance of a point P from the Lidar head's center, $\phi$ is an azimuthal angle of the Lidar head's spin relative to a referential, and $\theta$ is an elevation angle of a sensor k of the spinning Lidar head 10 relative to a horizontal referential plane.

Figure 3:
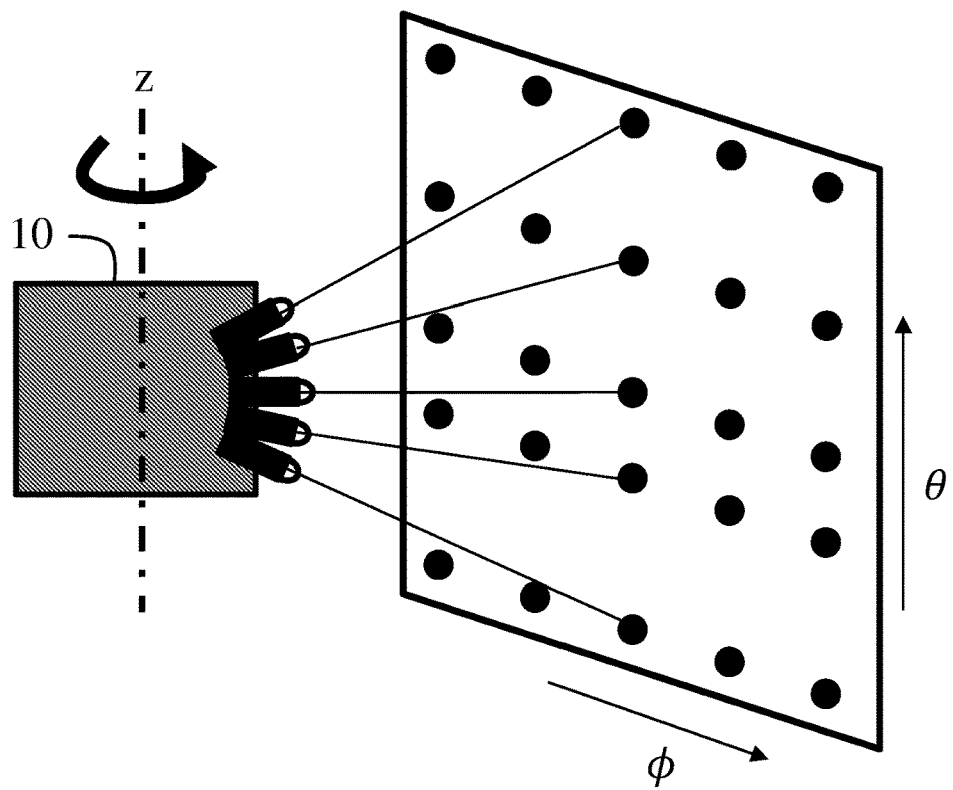
FIG. 3 shows schematically a regular distribution of data sensed by a spinning sensor head in accordance with an embodiment of the present application.

A regular distribution along the azimuthal angle has been observed on Lidar-sensed data as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i$, $\forall_i=0$ to I−1 where I is a number of azimuthal angles used for the sensing of the points and $\theta_j$, $\forall_j=0$ to J−1 where J is a number of sensors of the spinning Lidar head 10. Basically, G-PCC represents Lidar-sensed sparse geometry data in a two-dimensional (discrete) angular coordinate space (0, 0) as depicted on FIG. 3, together with a radius value $r_{3D}$ for each point.

This quasi 1D property has been exploited in G-PCC by predicting, in the spherical coordinate space, the location of a current point based on a precedingly coded point by using the discrete nature of angles.

Figure 4:
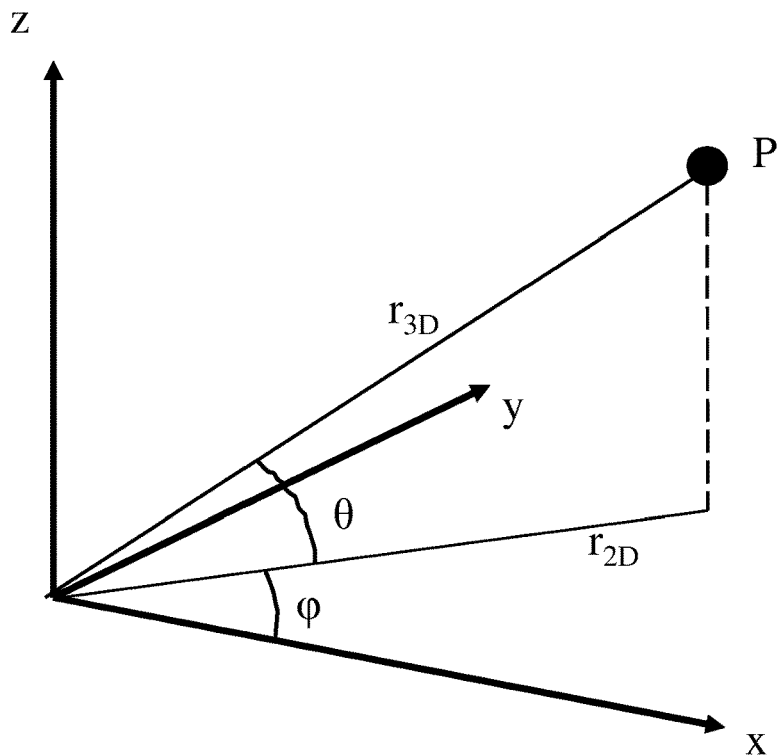
FIG. 4 shows schematically a representation of a point of a point cloud in a 3D space in accordance with an embodiment of the present application.

More precisely, the direct locations of points within a node are entropy encoded by using a context-adaptive entropy coder. Contexts are then obtained from the local conversion of the point locations into angular coordinates ($\phi$, $\theta$) and from the location of these angular coordinates relative to discrete angular coordinates ($\phi_i$, $\theta_j$) obtained from precedingly coded points. The predictive tree directly codes a first version of a point location in the angular coordinates ($r_{2D}$, $\phi$, $\theta$), where $r_{2D}$ is the projected radius on the horizontal xy plane as depicted on FIG. 4, using the quasi 1D nature ($r_{2D}$, $\phi_i$, $\theta_j$) of this angular coordinate space. Then, spherical coordinates ($r_{2D}$, $\phi$, $\theta$) are converted into 3D cartesian coordinates (x,y,z) and a xyz residual is coded to tackle the errors of coordinate conversion, the approximation of elevation and azimuthal angles and potential noise.

Sensing sparse geometry data of point cloud by using spinning sensors head has some drawbacks and other types of sensor head may be used.

The mechanical parts generating the spin (rotation) of a spinning sensors head are prone to breakage and are costly. Also, by construction, the angle of view is necessarily 2π. This does not allow to sense a particular region of interest with high frequency, for instance it may be more interesting to sense in front of a vehicle than behind. Practically in most cases, when a sensor is attached to a vehicle, most of the 2π angle of view is screened by the vehicle itself and the screened angle of view does not need to be sensed.

Figure 5:
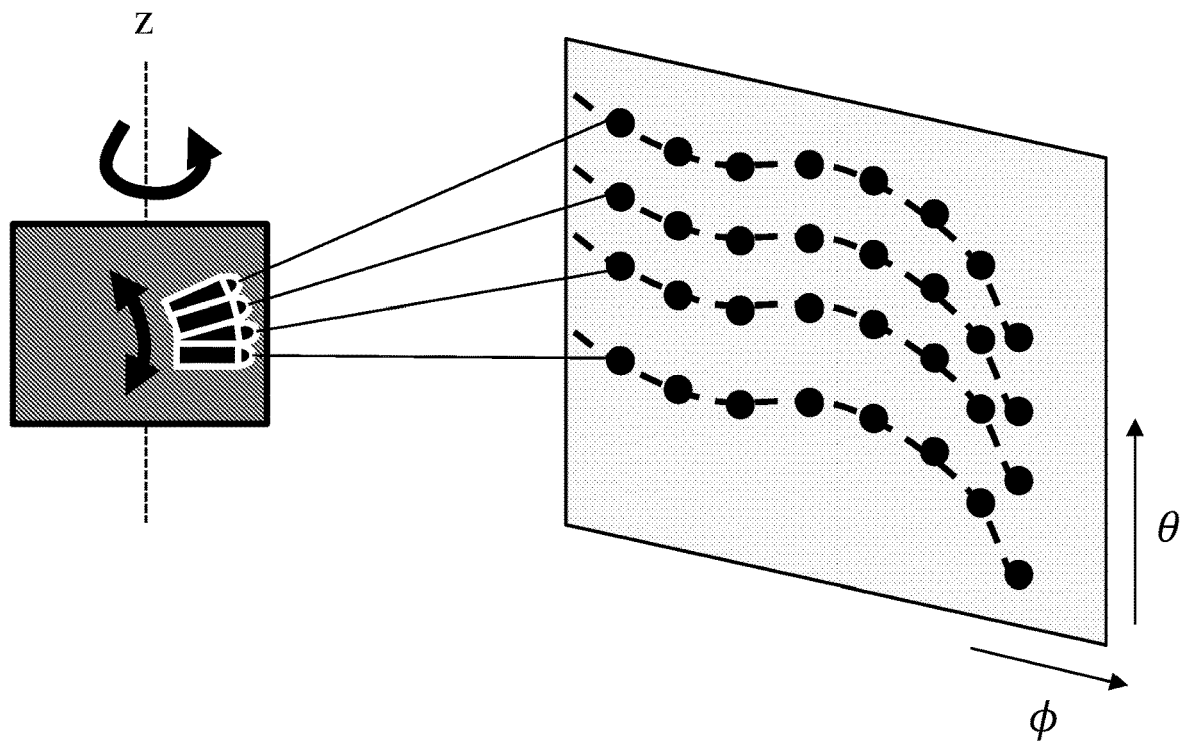
FIG. 5 shows schematically an example of a sensor head able to sense a real scene following a programmable sensing path in accordance with an embodiment of the present application.
Figure 6:
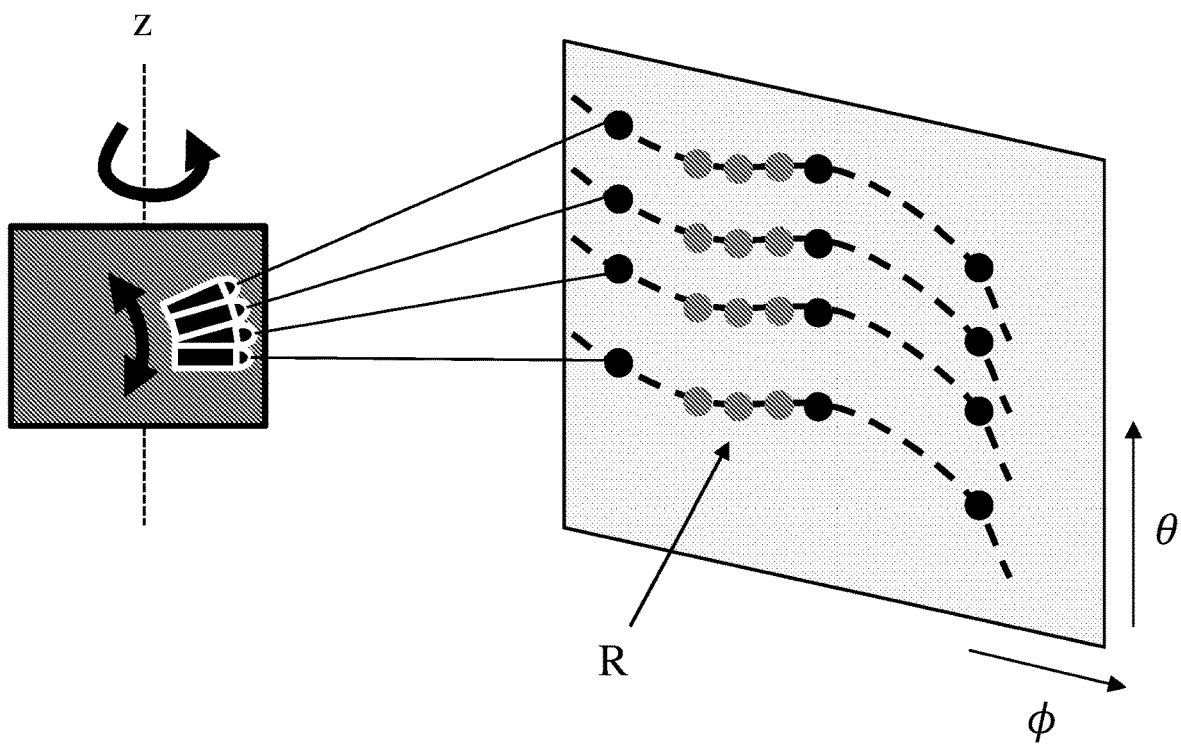
FIG. 6 shows schematically an example of a sensor head able to sense a real scene following a programmable sensing path according to different sensing frequencies in accordance with an embodiment of the present application.
Figure 7:
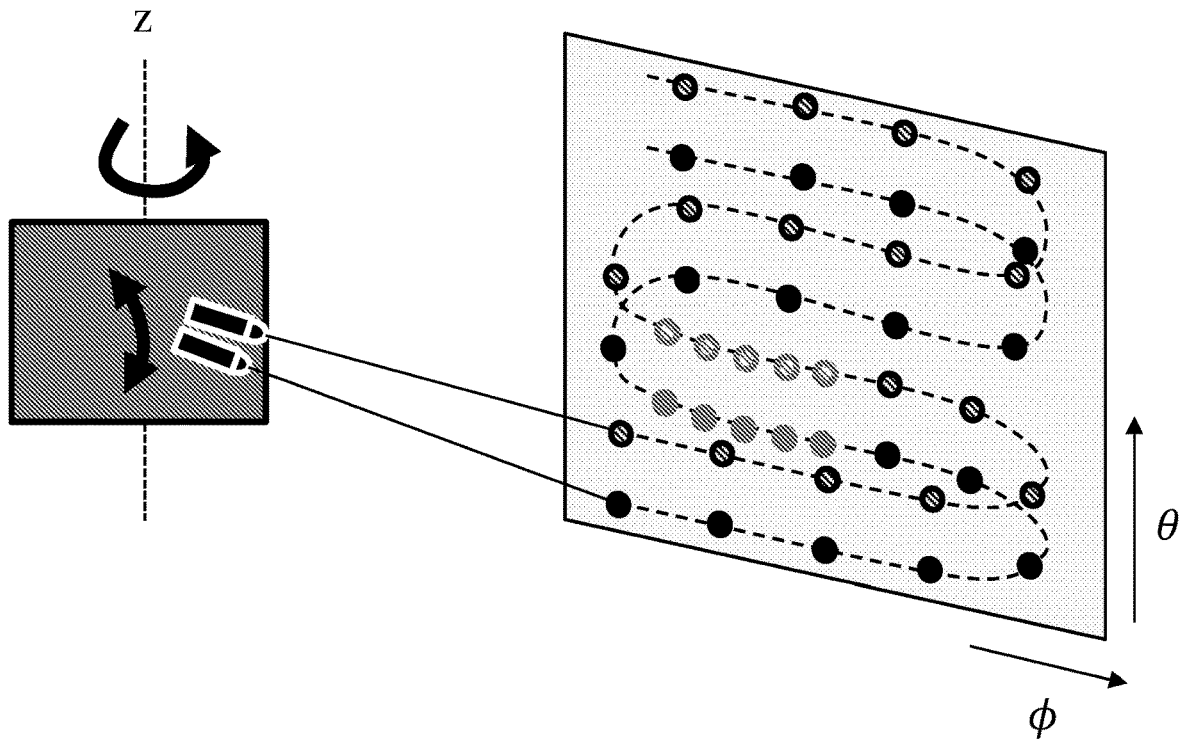
FIG. 7 shows schematically an example of a sensor head able to sense a real scene following a programmable zigzag sensing path according to different sensing frequencies in accordance with an embodiment of the present application.

New types of sensors, namely parametric sensors, have emerged recently, allowing for a more flexible selection of the region to be sensed. In most recent designs, a sensor can be more freely and electronically (thus avoiding fragile mechanical parts) moved to obtain a large variety of sensing path in the 3D scene as depicted on FIG. 5. On FIG. 5, a set of four sensors is shown. Their relative sensing directions, i.e. azimuthal and elevation angles, are fixed relative to each other, however they overall sense a scene following a programmable sensing path depicted by dashed lines on the two-dimensional angular coordinate ($\phi$, $\theta$) space. Points of the point cloud may then be sensed regularly along the sensing path. Some sensor head may also adapt their sensing frequency by increasing their sensing frequency when a region of interest R has been detected as illustrated on FIG. 6. Such a region of interest R may be associated with a close object, a moving object, or any object (pedestrian, other vehicle, etc.) precedingly segmented, for instance in a previous frame, or dynamically segmented during the sensing. FIG. 7 shows schematically another example of a sensing path (typical zigzag sensing path) used by a sensor head comprising two sensors able to increase their sensing frequencies when a region of interest has been detected (grey shaded points and grey hashed points). Using a zigzag sensing path may be advantageously used to sense a limited (azimuthal) angular sector of a 3D scene. Because sensors may be attached to a vehicle, their viewports of interest are necessarily limited by the presence of the vehicle itself that obstructs the scene, unless the sensors are located at the top of the car. Consequently, sensors with a limited probing angular sector are of high interest and easier to integrate to a vehicle.

Figure 8:
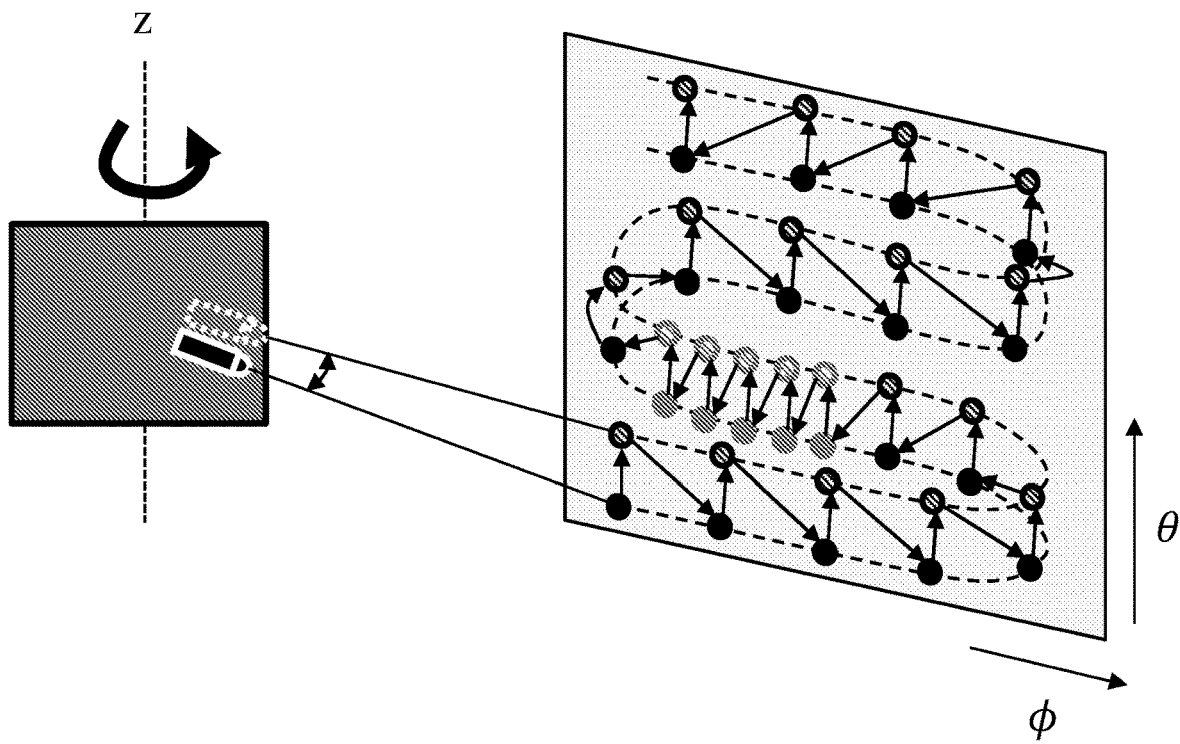
FIG. 8 shows schematically a single sensor head able to sense a real scene following a programmable zigzag sensing path according to different sensing frequencies in accordance with an embodiment.

As depicted on FIG. 8, a sensor head comprising a single sensor may also be used to sense multiple positions (two vertical positions on FIG. 8), for instance using reflections on mirrors oscillating with rotations (here vertical rotations). In that case, instead of using a set of sensors, a single sensor at different angular positions (i.e. with different elevation angle on FIG. 8) along a sensing path (here a zigzag sensing path) is used mimicking a sensing using a set of multiple sensors.

For the sake of simplicity, in the following descriptions and claims, the "sensor head" may refer to a set of physical sensors or a set of sensing elevation indexes mimicking a set of sensors as well. Also, one skilled in the art will understand that "a sensor" could also refer to a sensor in each sensing elevation index position.

In the working group ISO/IEC JTC 1/SC 29/WG 7 on MPEG 3D Graphics Coding, a codec named L3C2 (Low-Latency Low-Complexity Codec) is being considered to improve, relative to the G-PCC codec, the coding efficiency of Lidar-sensed point clouds. The codec L3C2 provides an example of a two-dimensional representation of the points of a point cloud denoted a coarse representation. A description of the code can be found in the output document of the Working Group in N00167, ISO/IEC JTC 1/SC 29/WG 7, MPEG 3D Graphics Coding, "Technologies under Consideration in G-PCC", Aug. 31, 2021.

Basically, for each sensed point $P_n$ of the point cloud, a sensor index $\lambda_n$ associated with a sensor that sensed the point $P_n$ and an azimuthal angle $\phi_n$ representing a sense angle of said sensor are obtained by converting 3D cartesian coordinates ($x_n$, $y_n$, $z_n$) representing the 3D location of the sensed point $P_n$. Points of the point cloud are then ordered based on the azimuthal angles $\phi_n$ and the sensor indices $\lambda_n$, for example, according to a lexicographic order based first on the azimuthal angle and then on the sensor index. The order index $o(P_n)$ of a point $P_n$ is then obtained by:

$$o(P_n) = \phi_n * K + \lambda_n$$

where K is the number of sensors.

Figure 9:
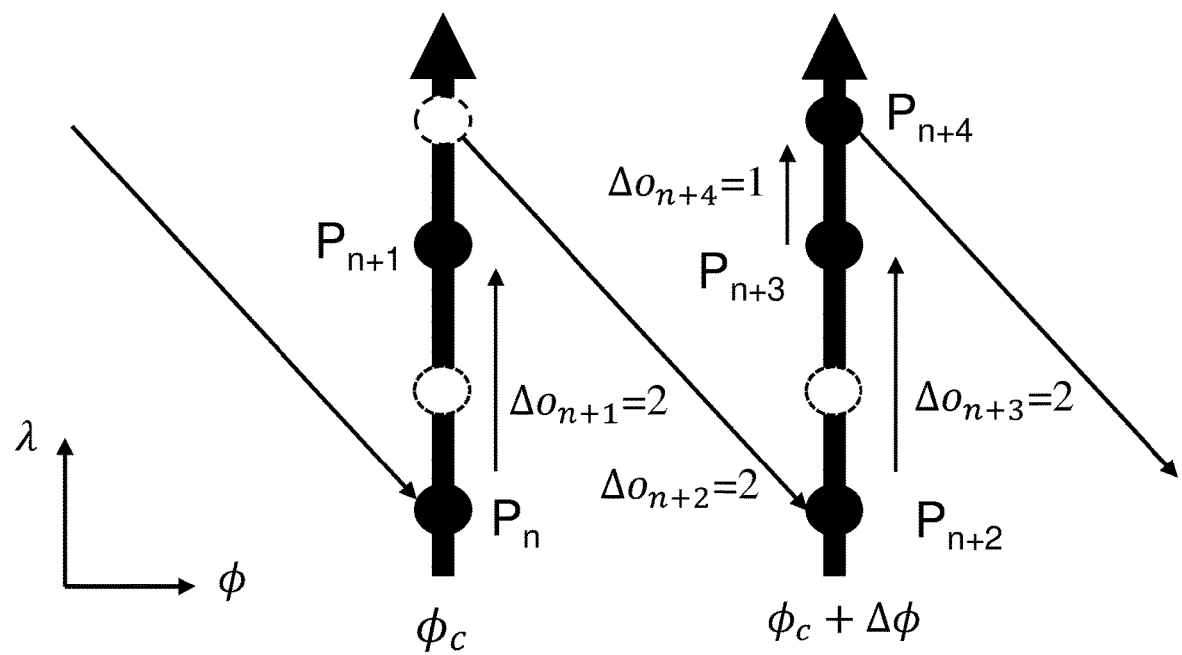
FIG. 9 shows schematically ordered coarse points of a coarse representation in accordance with at least one embodiment.

FIG. 9 shows schematically ordered coarse points of a coarse representation in accordance with at least one embodiment.

Five points of the point cloud have been sensed. Each of these five points are coarsely represented by a coarse point (black point) in the coarse representation: two coarse points $P_n$, and $P_{n+1}$ represent two points of the point cloud sensed at time $t_1$ with an angular angle $\phi_c$ and three coarse points represent three points of the point cloud sensed at time $t_2$ with an angular angle $\phi_c+\Delta\phi$ where $\Delta\theta$ is an azimuthal angle elementary shift. A coarse point that represents a sensed point of the point cloud is denoted an occupied coarse point and a coarse point that does not represent a sensed point of the point cloud is denoted an unoccupied coarse point. Because the points of the point cloud are represented by occupied coarse points in the coarse representation, the order indices associated with the points of the point cloud are also the order indices associated with the occupied coarse points.

The coarse representation of the point cloud geometry data may then be defined in a two-dimensional coordinate ($\phi$, $\lambda$) space.

The coarse representation may also be defined for any types of sensor head including spinning sensors or parametric sensors. The definition of the coarse representation is based on a sensing path defined from sensor characteristics in a two-dimensional angular coordinate ($\phi$, $\theta$) space comprising an azimuthal coordinate $\phi$ representative of an azimuthal angle representing a sensing angle of a sensor relative to a referential and an elevation coordinate $\theta$ representative of an elevation angle of a sensor relative to a horizontal referential plane. The sensing path is used to sense the points of the point cloud according to ordered coarse points representing potential locations of sensed points of the point cloud. Each coarse point is defined from one sample index s associated with a sensing time instant along the sensing path and one sensor index $\lambda$ associated with a sensor.

Figure 10:
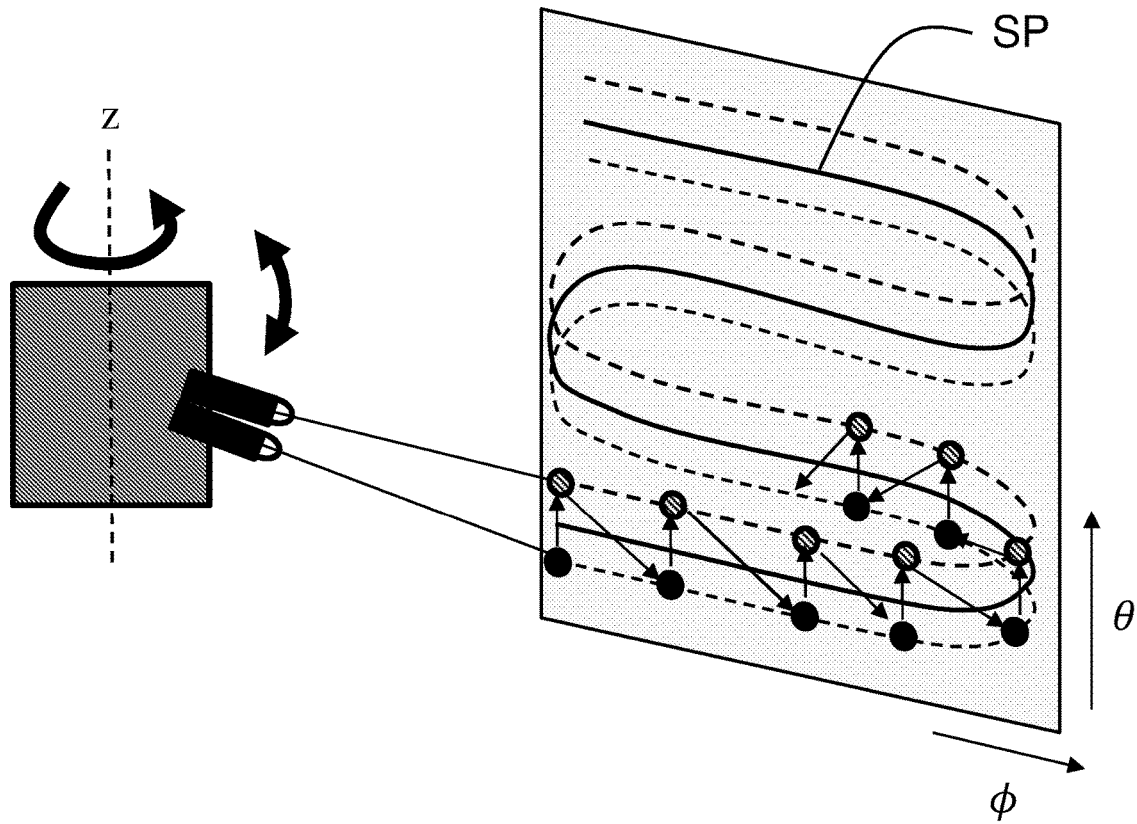
FIG. 10 shows schematically an example of an ordering of coarse points in accordance with one embodiment.
Figure 11:
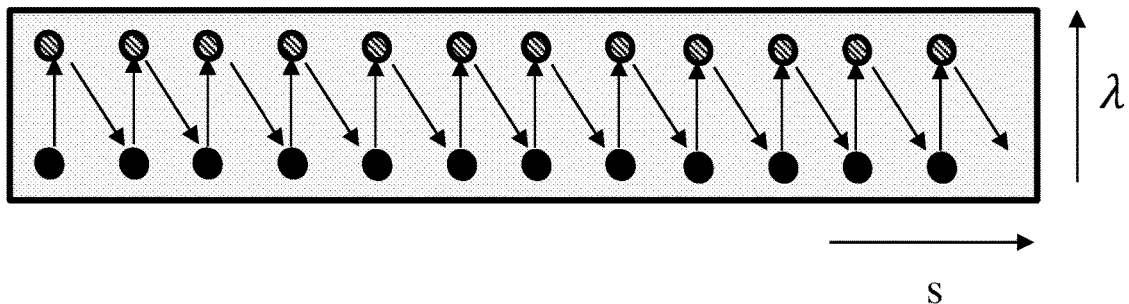
FIG. 11 shows schematically a representation of ordered coarse points in the two-dimensional coordinate $(s,\lambda)$ space in accordance with an embodiment.

On FIG. 10, a sensor head comprising two sensors is used. The sensing paths followed by the two sensors are represented in dash lines. For each sample index s (each sensing time instant), two coarse points are defined. The coarse points associated with the first sensor are represented by black shaded points on FIG. 10 and the coarse points associated with the second sensor are represented by a black hashed point. Each of these two coarse points belongs to a sensor sensing path (dashed line) defined from the sensing path SP. FIG. 11 shows schematically a representation of ordered coarse points in the two-dimensional coordinate (s,$\lambda$) space. Arrows on FIGS. 10 and 11 illustrate the links between two successive ordered coarse points.

Figure 12:
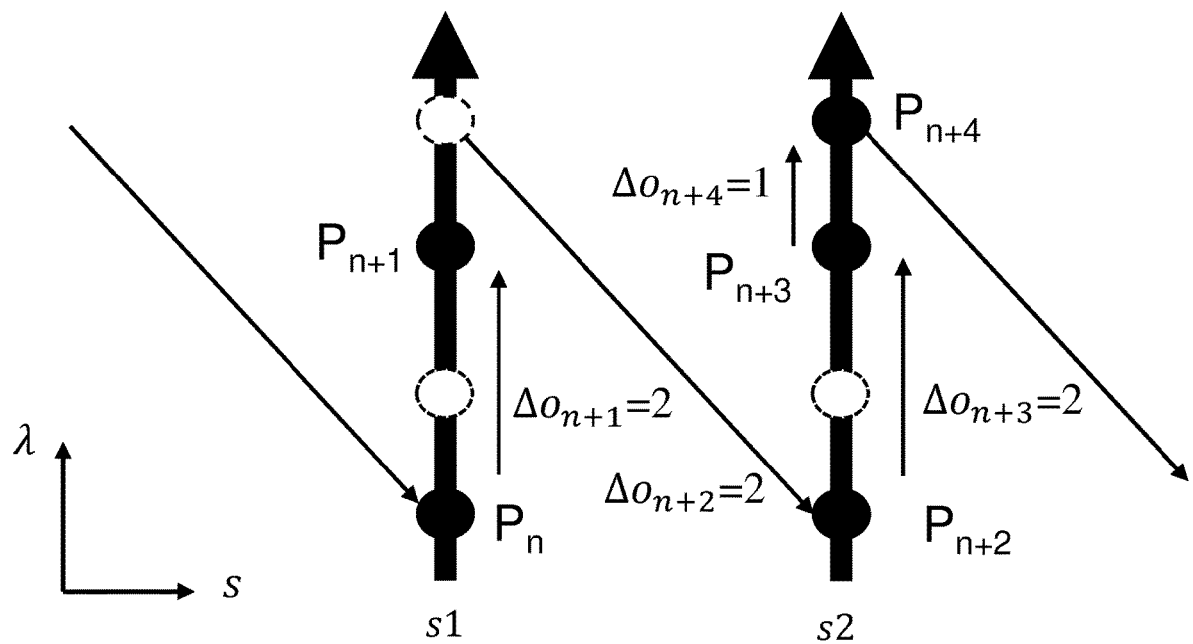
FIG. 12 shows schematically ordered coarse points of a coarse representation in accordance with at least one embodiment.

FIG. 12 illustrates ordered coarse points of a coarse representation in accordance with at least one embodiment.

Five occupied coarse points are represented (black circles): two coarse points $P_n$ and $P_{n+1}$ are occupied by two points of the point cloud sensed at a sensing time instant $t_1$ (corresponding to a sample index $s_1$) and three coarse points are occupied by three points of the point cloud sensed at a sensing time instant $t_2$ (corresponding to a sample index $s_2$).

The coarse representation of the point cloud geometry data may then be defined in a two-dimensional coordinate (s, $\lambda$) space.

Figure 13:
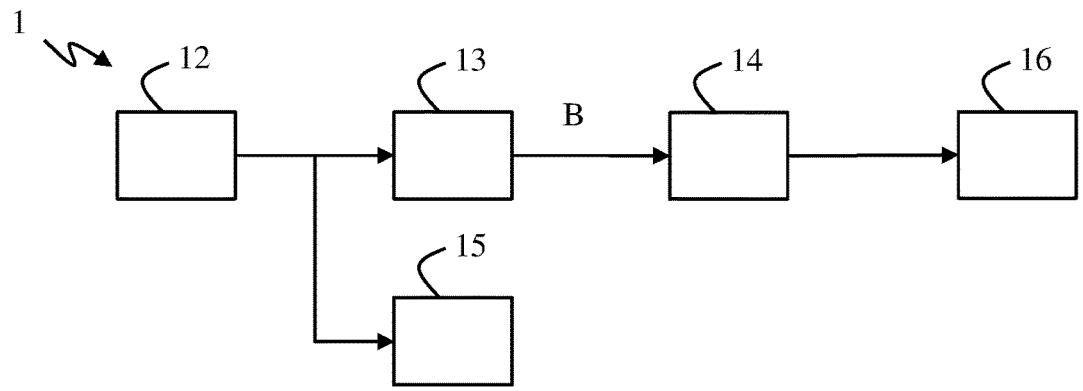
FIG. 13 shows schematically a system of a point cloud compression in automotive domain in accordance with an embodiment of the present application.

FIG. 13 shows schematically a system 1 of a point cloud compression in automotive domain in accordance with an embodiment of the present application.

The system 1 may comprise a sensor device 12, an encoder 13, a decoder 14 and, optionally, analytics device 15 and 16.

The sensor device 12, the encoder 13, the decoder 14 and, optionally the analytics devices 15 and 16 are connected though wireless or wired communications channels or more generally through communication networks.

The sensor device 12 may comprise a spinning sensor head or parametric sensor head that senses (captures) points (of objects) along time according to different sensing directions, i.e. along a sensing path or for different coordinates in the two-dimensional coordinate (s,$\lambda$) space. To perform points sensing, a sensor of the sensor device 12 sends electromagnetic/light signals in each sensing direction, and if a first object encountered in a given sensing direction is close enough, it returns a part of the signal to the sensor by reflecting it. The sensor can then estimate the distance to the object from the time difference between the sending and the receiving of the signal (corresponding to $r_{3D}$), and it can generate a point by providing sensed point cloud data comprising point cloud geometry data (typically coordinates ($r_{3D}$,s, $\lambda$) or ($r_{2D}$, $\phi$, $\theta$) or directly coordinates (x,y,z)) and other attributes like color, reflectance, acquisition timestamps, etc., for the given sensing direction (coordinates (s,$\lambda$)). The sensor device 12 may then (regularly or not) send sensed data by packets of points through a communication channel (for instance a transmission bus channel) or through a network to the encoder 13 and/or the analytics device 15.

The encoder 13 may provide a bitstream B organized in several chunks (for example slices) and each chunk can be sent (for example after being encapsulated into a network packet), through a second communication channel, as soon as it is available/ready (for low latency streaming) to the decoder 14. The decoder 14 may then decode the received chunks of the bitstream B and provide the decoded points of each chunk for example to the (real time) external analytics device 16.

In the following, the term "slice" or "slice of point cloud data" will be used but the term "chunk" could also be used. A chunk/slice may be seen as a section/portion of a bitstream of encoded point cloud data that can be easily extracted from the bitstream B (beginning and end of a chunk/slice are aligned on bytes). A slice of point cloud data may comprise point cloud data associated with at least one point of a point cloud. Point cloud data associated with a point of the slice of point cloud data may comprise point cloud geometry, i.e. the 3D locations of the point of sensed by any sensor head including a spinning sensors head and/or a single sensor head mimicking multiple sensors. Point cloud data associated with a point of the slice of point cloud data may also comprise point cloud attribute data representative of attributes associated with this point. A slice of point cloud data may also comprise a slice header and/or a slice footer providing information like, for example, a slice index, the number of points in the slice, the index of a geometry parameter set to be used for parameterizing a codec, the positioning of the slice in the point cloud, etc.

With L3C2, a slice of point cloud data may contain points cloud data associated with more than one sensor of a sensing device, and the point cloud data are encoded or decoded one sensor after the other: all the point cloud data (of a slice of point cloud data) associated with a first sensor are encoded or decoded, then all the point cloud data associated with a second sensor, etc. With L3C2 it may happen that for a particular sensor there is no point cloud data in the slice of point cloud data.

Typically, a slice of point cloud data is embedded in a payload of a network element: a block of data starting by a payload type (typically one byte), followed by a payload size (typically a 32 bits integer) and followed by the payload data (A slice of point cloud data for example).

For the sake of clarity, the following description assume point cloud data of a slice of point cloud data is associated with a single sensor of the sensing device 12. But one skilled in LiDAR point cloud compression would easily understand how to extend this description to point cloud data of a slice of point cloud data associated with more than one sensor.

Figure 14:
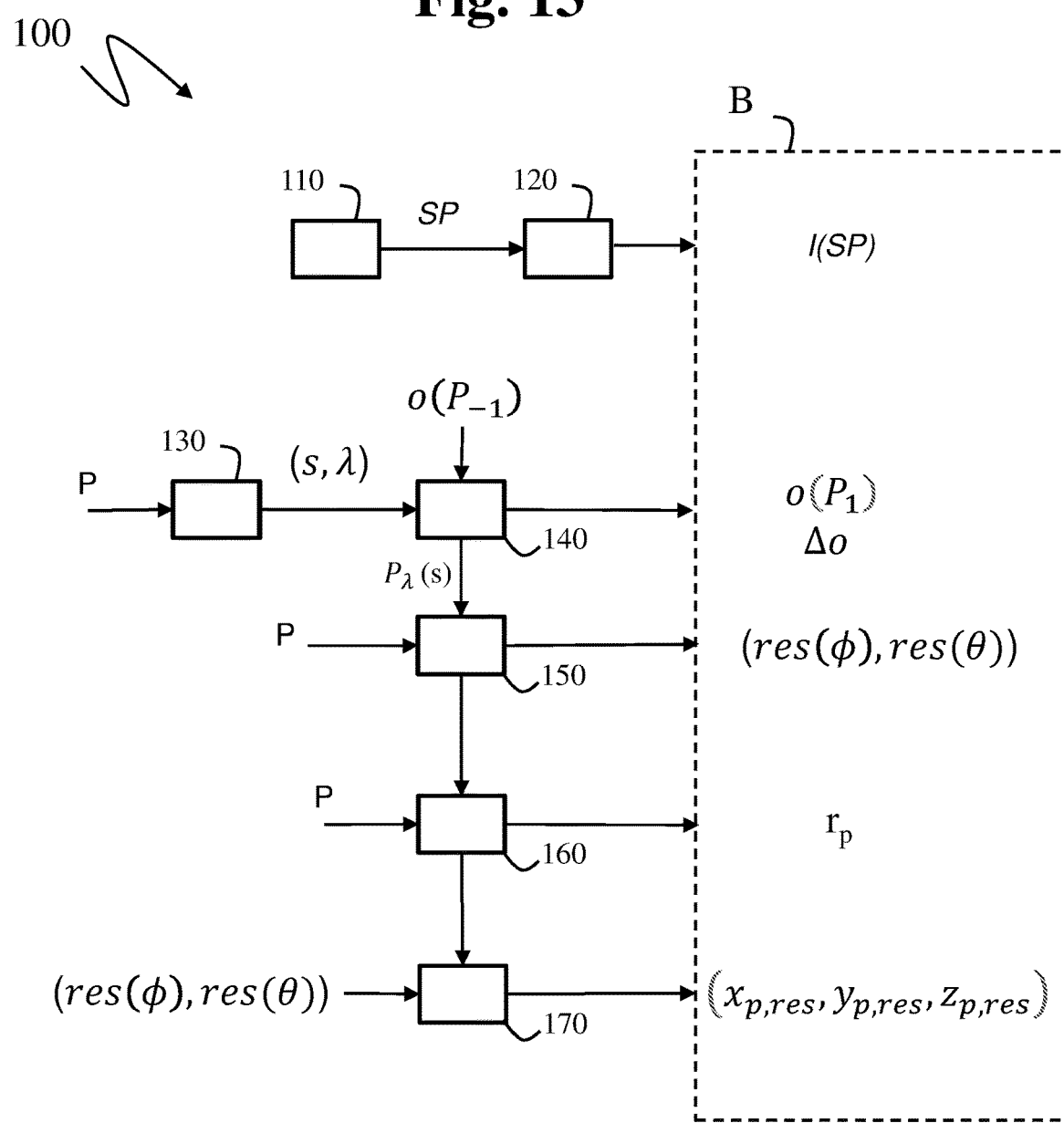
FIG. 14 illustrates a schematic block diagram of steps of a method 100 of encoding point cloud data of a slice of point cloud data in accordance with an embodiment of the present application.

FIG. 14 illustrates a schematic block diagram of steps of a method 100 of encoding point cloud data of a slice of point cloud data in accordance with an embodiment of the present application.

Coarse representations of points P of the slice of point cloud data may be equivalently defined in the two-dimensional coordinate (s,$\lambda$) space or in the two-dimensional coordinate (0, A) space because a spinning sensor head, such as a Lidar head, provides a particular coarse representation defined in the two-dimensional coordinate (s,$\lambda$) space in which, at each sensing time instant, sensors of the sensor head probe an object and the sensed points correspond to occupied coarse points of the coarse representation.

In step 110, a sensing path SP may be represented as a two-dimensional curve (or piecewise straight-line segments for instance) defined in a two-dimensional angular coordinate ($\phi$, $\theta$) space.

The sensing path SP is obtained from sensing characteristics. The two-dimensional angular coordinate ($\phi$, $\theta$) space comprises an azimuthal coordinate $\phi$ representative of an azimuthal angle representing a sensing angle of a sensor relative to a referential axis and an elevation coordinate $\theta$ representative of an elevation angle of a sensor relative to a horizontal referential plane.

The sensing path SP is used to sense the points P according to ordered coarse points $P_\lambda(s)$. A coarse point $P_\lambda(s)$ represents a potential location in the two-dimensional coordinate ($\phi$, $\theta$) space of a sensed point P. Each coarse point $P_\lambda(s)$ is defined in the two-dimensional angular coordinate ($\phi$, $\theta$) space from one sample index s associated with a sensing time instant along the sensing path SP, and one sensor index $\lambda_n$ associated with a sensor. A coarse point $P_\lambda(s)$ corresponds to a coarse representation of a potential sensed point of the point cloud.

An order index o(P) is associated with each coarse point according to the rank of said coarse point among the ordered coarse points.

In one embodiment, the order index o(P) of a coarse point occupied by a (sensed) point P may be obtained by:

$$o(P) = \lambda + s * K$$

where K is the number of sensors of a set of sensors or the number of different positions of a single sensor for a same sample index, $\lambda$ is the sensor index of the sensor that sensed the point P at the sensing time instant s.

In step 120, an information I(SP) representing the sensing path SP in the two-dimensional angular coordinate ($\phi$, $\theta$) space is encoded into a bitstream B.

Steps 130 to 170 run for each point P sensed by one of a sensor of a sensor head, each point P corresponding to a sensor index $\lambda$ that captured said point and sensing time instant s and thus corresponds to an occupied coarse point among the ordered coarse points.

A point P may be represented by three-dimensional cartesian coordinates ($x_p$, $y_p$, $z_p$) or three-dimensional spherical coordinates ($r_p$, $\phi_p$, $\theta_p$). Well-known methods in related art may be used to convert cartesian coordinates to spherical coordinates or inversely.

In step 130, one sample index s associated with a sensing time instant of a point P and one sensor index $\lambda$ of a sensor that sensed the point P is obtained. The sample index s and the sensor index $\lambda$ are obtained in a straightforward manner during sensing because the sensor index corresponds to the sensor used to sense the point P at a sensing time instant corresponding to the sample index s.

In step 140, one order index difference $\Delta o$ is encoded into the bitstream B. The order index difference $\Delta o$ represents a difference between an order index o(P) of a coarse point identified by the sample index s and the sensor index $\lambda_n$, and an order index $o(P_{-1})$ of another coarse point associated with a previous sensed point $P_{-1}$ of the point cloud:

$$\Delta o = o(P) - o(P_{-1})$$

In variant, the order index $o(P_1)$ of the first coarse point occupied by the first sensed point $P_1$ of the point cloud may be directly encoded into the bitstream B. This is equivalent to arbitrary setting the order index of a virtual zero-th point to zero, i.e. $o(P_0)=0$, and coding $\Delta o_1 = o(P_1) - o(P_0) = o(P_1)$.

Given the order index $o(P_1)$ of the first coarse point occupied by the first sensed point $P_1$ of the slide of point cloud data, and order differences Do, one can recursively reconstruct the order index o(P) of any coarse point occupied by a sensed point P of the slice of point cloud by:

$$o(P) = o(P_{-1}) + \Delta o$$

In step 150, point cloud geometry data of a point P is encoded into the bitstream B relatively to an occupied coarse point $P_\lambda(s)$ obtained from the sample index s and the sensor index $\lambda$, by encoding an angular residual (res($\phi$), res($\theta$)) based on angular coordinates ($\phi_p$, $\theta_p$) of the point P and angular coordinates ($\phi_\lambda$, $\theta_\lambda$) of the coarse point $P_\lambda(s)$:

$$(res(\phi), res(\theta)) = (\phi_P, \theta_P) - (\phi_\lambda, \theta_\lambda)$$

where ($\phi_\lambda$, $\theta_\lambda$) are the angular coordinates of the occupied coarse point $P_\lambda(s)$.

In step 160, the radius value $r_p$ of spherical or cylindrical coordinates of the point P is encoded into the bitstream B. A reconstructed radius value $r_{p,rec}$ may be obtained by decoding the encoded radius value $r_p$.

In one embodiment of step 160, the radius value $r_p$ may be quantized and the reconstructed radius value $r_{p,rec}$ may be obtained by inverse quantizing the quantized radius value $Q1(r_p)$.

For example, Q1 is a uniform quantizer using a quantization step $\Delta 1$:

$$Q1(r_p) = \text{round}\left(\frac{r_p}{\Delta 1}\right)$$

The reconstructed radius value $r_{p,rec}$ is then obtained by inverse quantizing the quantized radius value $Q1(r_p)$ by an inverse quantizer IQ1:

$$IQ1(Q1(r_p)) = Q1(r_p) * \Delta 1$$

Any other quantizer and inverse quantizer may be used.

In an embodiment of step 160, the radius value $r_p$ may be quantized and encoded, and the reconstructed radius value $r_{p,rec}$ is obtained by decoding and inverse quantizing the decoded radius value $r_p$.

In a variant, the radius value $r_p$ may be predicted by a radius predictor $Pr_p$ (a previously encoded radius for example) and a radius residual obtained as a difference between the radius value $r_p$ and the radius predictor $Pr_p$. may be encoded into the bitstream B. The reconstructed radius value $r_p$,rec is obtained by decoding the radius residual and by reverting the prediction and is thus equal to $r_p$.

In variant, the radius value $r_p$ may be predicted by a radius predictor $Pr_p$ (a previously encoded and reconstructed radius for example). A radius residual may be obtained as a difference between the radius value $r_p$ and the radius predictor $Pr_p$ and the radius residual may be quantized to obtain a quantized radius residual. The quantized radius residual may be entropy encoded into the bitstream B. A reconstructed radius value $r_{p,rec}$ may be obtained by decoding the quantized radius residual, inverse quantizing it and reverting the prediction. For example, using quantizer Q1 and inverse quantizer IQ1, the reconstructed radius value $r_{p,rec}$ may be given by:

$$r_{p,rec} = IQ1(Q1(r_p - Pr_p)) + Pr_p.$$

For example, Q1 is a uniform quantizer using a quantization step $\Delta 1$, the quantized radius residual is obtained by:

$$Q1(r_p - Pr_p) = \text{round}\left(\frac{r_p - Pr_p}{\Delta 1}\right).$$

The reconstructed radius value $r_{p,rec}$ is then obtained by inverse quantizing the quantized radius residual $Q1(r_p - Pr_p)$ by an inverse quantizer IQ1 and by adding the radius predictor $Pr_p$:

$$IQ1(Q1(r_p - Pr_p)) = Q1(r_p - Pr_p) * \Delta 1 + Pr_p.$$

In variant, the radius value $r_p$ or the quantized radius value $r_p$ or a radius residual or a quantized radius residual, may be context-based entropy encoded using an entropy coder like CABAC (Context-Adaptive Binary Arithmetic Coding) after binarization of their values.

In one embodiment, the method 100 may further comprise, in step 170, encoding, into the bitstream B, a cartesian coordinate residual $(x_{p,res}, y_{p,res}, z_{p,res})$ for the point P based on the cartesian coordinates of the point P and cartesian coordinates $(x_{p,rec}, y_{p,rec}, z_{p,rec})$ of a reconstructed point $P_{rec}$ obtained from the coarse point $P_\lambda(s)$, the angular residual $(res(\phi), res(\theta))$ and the reconstructed radius value $r_{p,rec}$.

First, angular coordinates $(\phi_{rec}, \theta_{rec})$ of the reconstructed point $P_{rec}$ are obtained by adding the angular coordinates $(\phi_\lambda, \theta_\lambda)$ of the coarse point $P_\lambda(s)$ and the angular residual $(res(\phi), res(\theta))$:

$$(\phi_{rec}, \theta_{rec}) = (\phi_\lambda, \theta_\lambda) + (res(\phi), res(\theta)) \quad (1)$$

Next, cartesian coordinates $(x_{p,rec}, y_{p,rec}, z_{p,rec})$ of the reconstructed point $P_{rec}$ are obtained from the angular coordinates $(\phi_{rec}, \theta_{rec})$ of the reconstructed point $P_{rec}$ and the radius value $r_{p,rec}$:

$$\begin{cases} x_{p,rec} = r_{p,rec} * \cos(\phi_{rec}) \\ y_{p,rec} = r_{p,rec} * \sin(\phi_{rec}) \\ z_{p,rec} = r_{p,rec} * \tan(\theta_{rec}) \end{cases} \quad (2)$$

Finally, the cartesian coordinate residual $(x_{p,res}, y_{p,res}, z_{p,res})$ is obtained based on the cartesian coordinates $(x_p, y_p, z_p)$ of the point P and the cartesian coordinates $(x_{p,rec}, y_{p,rec}, z_{p,rec})$ of the reconstructed point $P_{rec}$:

$$(x_{p,res}, y_{p,res}, z_{p,res}) = (x_p, y_p, z_p) - (x_{p,rec}, y_{p,rec}, z_{p,rec}) \quad (3)$$

In variant, a quantized cartesian coordinate residual Q2 $(x_{p,res}, y_{p,res}, z_{p,res})$ may be obtained by quantizing the cartesian coordinate residual $(x_{p,res}, y_{p,res}, z_{p,res})$ and the quantized cartesian coordinate residual $Q2(x_{p,res}, y_{p,res}, z_{p,res})$ may be encoded into th bitstream B.

For example, Q2 is a uniform quantizer using a quantization step $\Delta 2$:

$$Q2(x_{p,res}, y_{p,res}, z_{p,res}) = \text{round}\left(\frac{(x_{p,res}, y_{p,res}, z_{p,res})}{\Delta 2}\right)$$

The cartesian coordinate residual $(x_{p,res}, y_{p,res}, z_{p,res})$ may be obtained by inverse quantizing the quantized cartesian coordinate residual $Q2(x_{p,res}, y_{p,res}, z_{p,res})$ by:

$$IQ2(Q2(x_{p,res}, y_{p,res}, z_{p,res})) = Q2(x_{p,res}, y_{p,res}, z_{p,res}) * \Delta 2$$

Any other quantizer and inverse quantizer may be used.

In variant, the quantized cartesian coordinate residual Q2 $(x_{p,res}, y_{p,res}, z_{p,res})$ may be context-based entropy encoded using an entropy coder like CABAC after binarization of their values.

Any other entropy coder may be used.

In variant, a quantized angular residual $Q3(res(\phi), res(\theta))$ may be obtained by quantizing the angular residual $(res(\phi), res(\theta))$ and the quantized angular residual $Q3(res(\phi), res(\theta))$ is encoded into the bitstream B.

Angular coordinates of the reconstructed point $P_{rec}$ (equation 1) are then obtained by:

$$(\phi_{rec}, \theta_{rec}) = (\phi_\lambda, \theta_\lambda) + IQ3(Q3(res(\phi), res(\theta)))$$

For example, Q3 is a uniform quantizer using a quantization step $\Delta 3$:

$$Q3((res(\phi), res(\theta))) = \text{round}\left(\frac{(res(\phi), res(\theta))}{\Delta 3}\right)$$

And IQ3 is the inverse quantizer:

$$IQ3(Q3(res(\phi), res(\theta))) = Q3(res(\phi), res(\theta)) * \Delta 3$$

Any other quantizer and inverse quantizer may be used.

In variant, the quantized angular residual $Q3(res(\phi), res(\theta))$ may be context-based entropy encoded using an entropy coder like CABAC after binarization of their values.

Any other entropy encoder may be used.

Point cloud attribute data of a point P of the slice of point cloud data may be predictive encoded based on previously encoded/decoded point cloud attribute data. A residual of a predicted attribute value may be encoded into the bitstream B, and optionally, a quantized residual is encoded.

In variant, the residual or the quantized residual may be context-based entropy encoded using an entropy coder like CABAC after binarization of their values.

Figure 15:
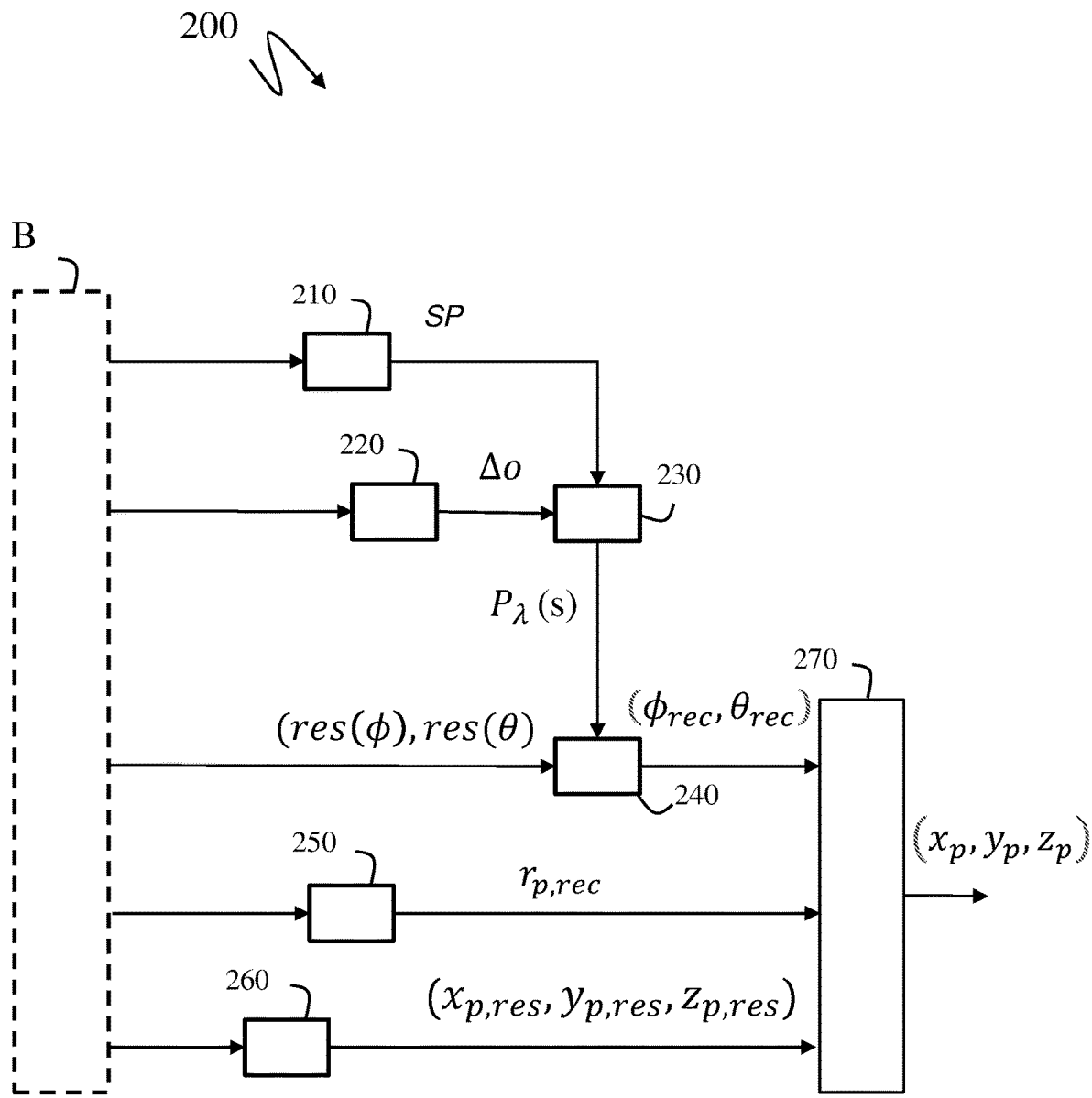
FIG. 15 illustrates a schematic block diagram of steps of a method 200 of decoding point cloud data of a slice of point cloud data in accordance with an embodiment of the present application.

FIG. 15 illustrates a schematic block diagram of steps of a method 200 of decoding point cloud data of a slice of point cloud data in accordance with an embodiment of the present application. Decoding points of a point cloud from a bitstream B requires information such as a number N of points of the point cloud. This information may be decoded from the bitstream B or received by any other means or may be known beforehand by a decoder.

In step 210, the information I(SP) is decoded from a bitstream.

Steps 220-260 run for each point P of the slice of point cloud data.

In step 220, one order index difference Δo is decoded from the bitstream B for a point P of the slice of point cloud data.

The order index difference Δo represents a difference between an order index o(P) of a coarse point associated with the point P, and an order index o(P$_{-1}$) of another coarse point associated with a previous decoded point P$_{-1}$ of the point cloud.

In variant, the order index o(P$_1$) of the first coarse point (occupied by the first point P$_1$ of the point cloud to be decoded) is directly decoded from the bitstream B.

In variant, the order index differences Do, may be decoded using an context-based entropy decoder like CABAC.

Any other entropy decoder may be used.

In step 230, one sensor index λ associated with a sensor that sensed the point P and one sample index s associated with the sensing time instant of the point P are obtained from an order index o(P) obtained from the decoded order index difference Δo.

The sensor index λ and the sample index s are obtained from the order index o(P) by:

$$\lambda = o(P) \text{ modulo } K$$

$$s = o(P)/K$$

where the division/K is the integer division (aka Euclidian division). Therefore, o(P) or o(P$_1$) and successive Δo are an alternative representation of λ and s.

In step 240, point cloud geometry data of a point P is decoded relatively to the coarse point P$_\lambda$(s).

In one embodiment of step 240, decoding a point P of the point cloud relatively to a coarse point P$_\lambda$(s) may comprise decoding an angular residual (res(ϕ), res(θ)) and obtaining angular coordinates (ϕ$_{rec}$, θ$_{rec}$) of a reconstructed point P$_{rec}$ by adding said decoded angular residual (res(ϕ), res(θ)) and angular coordinates (ϕ$_\lambda$, θ$_\lambda$) of the coarse point P$_\lambda$(s) (equation 1).

In step 270, the cartesian coordinates (x$_p$, y$_p$, z$_p$) of the point P is then the cartesian coordinates (x$_{p,rec}$, y$_{p,rec}$, z$_{p,rec}$) obtained from the angular coordinates (ϕ$_{rec}$, θ$_{rec}$) of a reconstructed point P$_{rec}$ and a radius value r$_{p,rec}$ by equation (2).

Optionally, the method 200 may further comprise in step 250, decoding, from the bitstream B, the radius value r$_{p,rec}$.

In one embodiment of step 250, the radius value r$_{p,rec}$ may be context-based entropy-decoded using an entropy decoder like CABAC.

In one embodiment of step 250, the radius value r$_p$,dec may be inverse quantized by the inverse quantizer IQ1. Any other inverse quantizer may be used.

In an embodiment of step 250, the radius value r$_{p,rec}$ may be decoded and inverse quantized.

Optionally, the radius value r$_{p,rec}$ or a quantized radius value may be obtained by adding a decoded radius residual with a predicted radius.

In variant, the radius value r$_{p,rec}$ or the quantized radius value or the radius residual may be context-based entropy decoded using an entropy decoder like CABAC.

Any other entropy decoder may be used.

In one embodiment, the method 200 further comprises in step 260, decoding a cartesian coordinate residual (x$_{p,res}$, y$_{p,res}$, z$_{p,res}$) from the bitstream B. The cartesian coordinate residual (x$_{p,res}$, y$_{p,res}$, z$_{p,res}$) is given by equation (3).

In step 270, the cartesian coordinates (x$_P$, y$_p$, z$_p$) of the point P is then obtained by adding the decoded cartesian coordinate residual (x$_{p,res}$, y$_{p,res}$, z$_{p,res}$) and the cartesian coordinates of the reconstructed point P$_{rec}$:

$$(x_p, y_p, z_p) = (x_{p,res}, y_{p,res}, z_{p,res}) + (x_{p,rec}, y_{p,rec}, z_{p,rec})$$

In variant, the cartesian coordinate residual (x$_{p,res}$, y$_{p,res}$, z$_{p,res}$) may be obtained by decoding and inverse quantizing using the inverse quantizer IQ2.

Any other inverse quantizer may be used.

In variant, the decoding may be a context-based entropy decoder using an entropy decoder like CABAC.

Any other entropy decoder may be used.

In variant, an angular residual (res(ϕ), res(θ)) is obtained by decoding a quantized angular residual Q3(res(ϕ), res(θ)) and inverse quantizing it by using the inverse quantizer IQ3.

Any other inverse quantizer may be used.

In variant, the decoding is an entropy decoder using a context-based entropy decoder like CABAC.

Any other entropy decoder may be used.

Angular coordinates of the reconstructed point P$_{rec}$ (equation 1) are then obtained by:

$$(\phi_{rec}, \theta_{rec}) = (\phi_\lambda, \theta_\lambda) + IQ3(Q3(res(\phi), res(\theta)))$$

Point cloud attribute data of a point P of the slice of point cloud data may be predictive decoded based on previously encoded/decoded point cloud attribute data. A residual of a predicted attribute value may be decoded from the bitstream B, and optionally, a quantized residual is decoded.

In variant, the residual or the quantized residual may be context-based entropy decoded using an entropy coder like CABAC.

Figure 16:
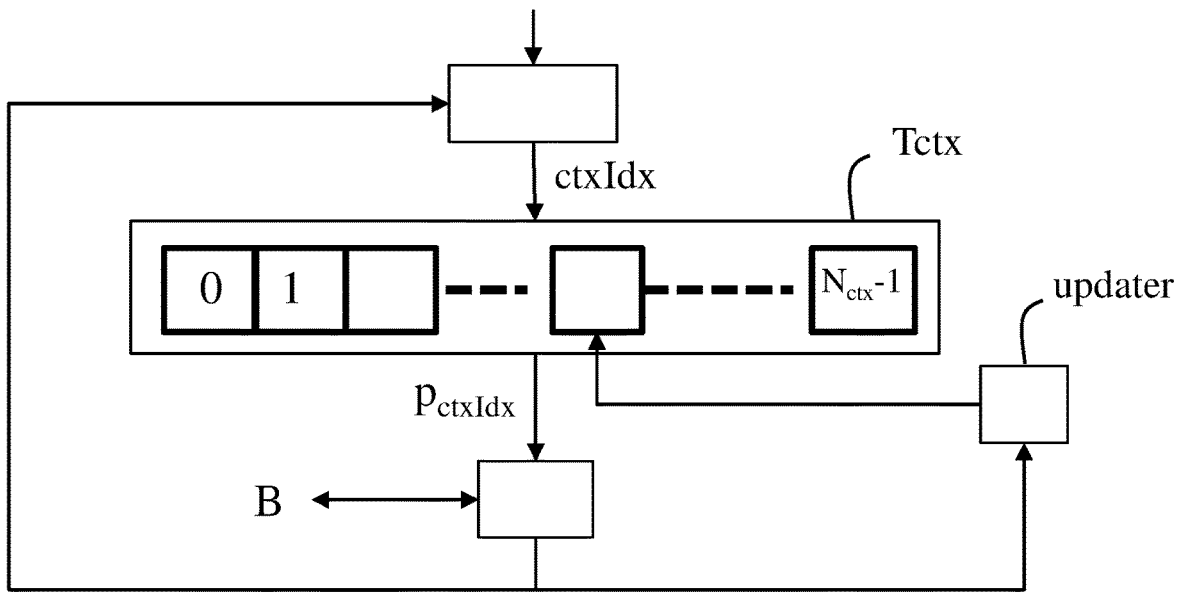
FIG. 16 shows a schematic block diagram of steps of a Context Adaptive Binary Arithmetic Coder in accordance with at least one embodiment.

FIG. 16 shows a schematic block diagram of steps of a Context Adaptive Binary Arithmetic Coder in accordance with at least one embodiment;

An entropy contexts table Tctx with N$_{ctx}$ entries usually store probabilities associated with contexts (for example data defined in a spatial area surrounding of a binary data to be encoded/decoded). A context index ctxIdx is obtained from an input binary data d to be encoded/decoded and a probability p$_{ctxIdx}$ is obtained as the ctxIdx-th entry of the entropy contexts table Tctx.

Entropy coders are usually arithmetic coders but may be any other type of entropy coders like asymmetric numeral systems. In any case, optimal coders add $-\log^2(p_{ctxIdx})$ bits in the bitstream B to encode/decode an input binary data d=1 or $-\log 2(1-p_{ctxIdx})$ bits in the bitstream B to encode/decode d=0. Once the input binary data d is encoded/decoded, the probability $p_{ctxiax}$ is updated by using an updater taking the encoded input binary data d and $p_{ctxidx}$ as entries; the updater is usually performed by using updated tables. The updated probability replaces the ctxIdx-th entry of the context table Tctx. Then, another input binary data d can be encoded/decoded, and so on. The update loop back to the entropy context table is a bottleneck in the coding workflow as another input binary data d can be encoded/decoded only after the update has been performed. For this reason, the memory access to the entropy context table must be as quick as possible and minimizing the size of the entropy context table helps easing its hardware implementation.

Selecting an adequate context, i.e. the probability $p_{ctxIdx}$ that estimates at best the chance of an input binary data d to be equals to 1, is essential to obtain good compression. Therefore, the context selection should use the data of at least one neighborhood data belonging to a causal neighborhood of an input binary data d, and correlation between them to obtain this adequate context.

Generally speaking, in systems like the one illustrated in FIG. 13, the smaller the size of a slice of point cloud data (in number of points or in number of packets of points) will be (down to the size of a single packet of points coming from the sensor) the lower would be the latency (as a time duration between the capture of point cloud data associated with a point by the sensor device 12 and its output by the decoder 16), because the encoder 13 does not need to wait further packets of points from the sensor device 12 before being able to transmit the slices of point cloud data to the decoder 14. And so, the decoder 14 can start decoding earlier. The main issue with having small slices of point cloud data is that it reduces compression efficiency when looking at the total amount of transmitted data. First there is a bit rate increase introduced by the slice header/footer data which needs to be provided for each slice of point cloud data. Second the efficiency of the compression of the point cloud data relative to the point cloud may suffer of the splitting into slices of point cloud data.

Initially in G-PCC, each slice of point cloud data was always encoded or decoded independently of the other slices of point cloud data (and a fortiori from previous slices of point cloud data). Thus, point cloud data of each slice of point cloud data was always encoded as independent point clouds. The only relations between the point cloud data in the slices of point cloud data were defined by commonly shared parameter set(s), for example, a common spatial geometry space, with eventually tilling information. Thus, the encoding or decoding process of any current slice could not exploit information coming from any previously encoded slices of point cloud data to improve the coding efficiency. The encoding or decoding process of each slice of point cloud data was thus always starting from scratch, i.e. coding parameter values used by the encoder or decoder was initialized for encoding each slice of point cloud data by default (starting) coding parameter values.

Independent encoding/decoding of slices of point cloud data decreases coding efficiency especially when a point cloud to be encoded is split into many small slices of point cloud data. To overcome this issue in low latency scenarios, in G-PCC, a special feature, denoted entropy continuation, has been introduced. The entropy continuation offers the possibility to preserve (i.e. save, store) the content of entropy contexts tables, i.e. the content of the probability tables used and updated by CABAC during entropy coding/decoding (FIG. 16), between successive encoding/decoding of slice of point cloud data. The entropy continuation may be enabled/disabled thanks to a binary syntax element denoted entropy_continuation_enabled_flag that is provided in a sequence parameter set of the bitstream B. When the entropy continuation is enabled (entropy_continuation_enabled_flag=1), then the entropy context tables are preserved, for instance stored in memory, at the end of an encoding/decoding of a slice of point cloud data, and a binary syntax element denoted entropy_continuation_flag is also provided in the slice header. If entropy_continuation_flag=1, an index of a previously encoded slice of point cloud data is also provided in the slice header. Then, at the starting of the encoding/decoding of a current slice of point cloud data, the preserved entropy coding context tables relative to an indexed previously encoded slice of point cloud data are restored (for example from a memory), and the entropy coding context tables relative to the encoding/decoding of the current slice of point cloud data are initialized from said preserved entropy coding context tables. During the encoding/decoding of the current slice of point cloud data, the entropy coding context tables are updated, as usual (i.e. with the same process as without entropy continuation), based on encoded point cloud data (FIG. 16) and at the end of the encoding/decoding of the current slice of point cloud data, the entropy context tables are preserved.

As an example, the sensor performs 10 rotations per second, which is a typical value for spinning sensors. A slice of point cloud data corresponding to 1 ms would then contain all the points probed during $\frac{1}{100}$ of a rotation. Considering the coding efficiency of a usual low latency codec, when generating one of such slice of point cloud data every millisecond (i.e. when using a slicing period of 1 ms) into a bitstream only containing independently coded slices of point cloud data, the size of the bitstream B for lossless geometry point cloud data is increased by about 30% as compared to a single slice of point cloud containing geometry point cloud data probed along a full turn rotation. When the bitstream contains one independently coded slice of point cloud data at the beginning of every full turn rotation of the sensor (i.e. every $\frac{1}{10}$s), for resynchronization in case of loss during the transmission, and using entropy continuation for every other slice of point cloud data of a full turn rotation of the sensor, the bitstream size increase becomes around 13%. This is still an important increase of the bandwidth requirements for low latency streaming.

Using the entropy continuation improves the coding efficiency in low latency scenarios and is sufficient for reasonable size of slices of point cloud data (i.e. not too small). But for really low latency, the size of the slices of point cloud data may become too small and the entropy continuation improvements are not enough. For example, in automotive, one may use slices of point cloud data that would contain points probed by the sensor device 12 every millisecond or less. In that case, the bandwidth gain obtained by the use of the entropy continuation, as compared to independent slices of point cloud data, is not enough: the bandwidth increase, as compared to non-low latency single slice of point cloud data per full turn rotation, becomes important.

To reduce the latency, the slicing period could be reduced to 0.5 ms or even 0.25 ms but the bitstream size would then further increase and it would become around 53% (for a slicing period of 0.5 ms) and around 89% (for a slicing period of 0.25 ms) for point cloud geometry data of a bitstream only containing independently encoded slices of point cloud data, and around 25% (for a slicing period of 0.5 ms) and around 47% (for a slicing period of 0.25 ms) for encoding/decoding using independently encoded slices of point cloud data every $\frac{1}{10}$s and using entropy continuation in the other slices of point cloud data. These bandwidth overheads become really too much.

Bitstream size for coded point cloud attribute data, even if less impacted (and less representative of the bitstream size than point cloud geometry data) also suffers of the bandwidth overhead even if it also benefits of the advantages of the entropy continuation.

Coding efficiency has to be improved as discussed above when using successive (small/tiny) slices of point cloud data for low latency scenario delivering slices of point cloud data sensed by sensing devices.

At least one embodiment of the present application has been devised with the foregoing in mind.

At least one of the aspects generally relates to point cloud encoding and decoding, one other aspect generally relates to transmitting a bitstream provided or encoded and one other aspects relates to receiving/accessing a decoded bitstream.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

The present invention relates to encoding/decoding a slice of point cloud data into/from a bitstream comprising context-based entropy encoding the slice of point cloud data based on entropy context tables. First, a previous coding state is obtained. The previous coding state is represented by at least one coding parameter value, apart from data representative of the content of an entry of an entropy context table, used to previously encoding another slice of point cloud data. Next, a current coding state is initialized from the previous coding state. The current coding state is represented by at least one current coding parameter. The slice of point cloud data is then encoded/decoded based on the current coding state that is updated during the encoding/decoding of the slice of point cloud data according to encoded point cloud data obtained by encoding the slice of point cloud data. This is a usual encoding/decoding of a slice of point cloud based on at least one coding parameter representing the current coding state. During the encoding/decoding of the slice of point cloud data, said at least one coding parameter may be updated according to encoded point cloud data of said slice of point cloud data. Finally, during the encoding/decoding, and/or at the end of the encoding/decoding of the slice of point cloud data, the current coding state represented by at least one current coding parameter, is preserved.

According to the invention, a coding state is represented by at least one coding parameter value apart data representative of the content of an entry of an entropy context table. A coding state may then be represented by an index of an entry of an entropy context table. Preserving (storing) a coding state may comprises preserving an index of an entry of an entropy context table. This is different of the entropy continuation which preserves the content of the entropy context tables. Preserving coding state may thus be combined with entropy continuation.

According to the invention, a current coding state used for encoding a slice of point cloud data is initialized from a previous coding state used for encoding another slice of point cloud data. This improves the coding efficiency compared to an initialization of the current coding state by default values because the semantic content of point cloud data belonging to different slices of point cloud data are coherent to each other. Since the coding efficiency of the slices of point cloud data is improved, the present invention reduces the cost of truncating the point cloud into shorter slices. The shorter the slices of point cloud data are, the faster they can be output by an encoder, and so the shorter is the delay between inputting a point cloud data associated with a point in the encoder and obtaining an output slice of point cloud data containing it. Slices of point cloud data may then be encapsulated into network packets and transmitted to a decoder through a transmission channel. Then, for a limited transmission bandwidth, shorter slices of point cloud data can be used and so the present invention also improves the latency because the overall time between the input of point cloud data associated with a point of the point cloud to an encoder and its decoding by a decoder is reduced.

The present invention may be preferably combined with the entropy continuation to get their advantages but the present invention may also be used without the entropy continuation (disabled).

Encoding/decoding a slice of point cloud data according to the present invention is particularly advantageous when point cloud data is represented by a coarse representation as discussed above, because each coding state, for example at the end of the encoding of a slice of point cloud data, may be efficiently preserved (for example stored in memory). As compared to other representations of point cloud data, the coding state for a coarse representation would generally be more compact (i.e. would require less memory to be stored).

For example, the coding state may be represented by a positioning in an encoding/decoding path used by the coarse representation to determine an encoding/decoding order of point cloud geometry data that is mostly predefined and driven by coordinates of a two-dimensional coordinates space. Such a positioning may be represented by a single coding parameter that may be either a coordinate value of the two-dimensional coordinate ($\phi$, $\lambda$) space or a coordinate value the two-dimensional coordinate (s, $\lambda$) space or the order index o(P), that may be preserved (stored in memory) as few bits.

Encoding/decoding a slice of point cloud data according to the present invention may also apply to the predictive tree encoding/decoding of G-PCC. But representing a coding state of the predictive tree may be costly in term of memory used for storing it, because the encoding/decoding path in a predictive tree has to be usually exactly represented. The stack containing the status of the parent nodes in the predictive tree that would be then required to preserve said encoding/decoding path may be very huge and not predictable. The amount of memory used to preserve a coding state may thus vary from one slice of point cloud data to another. Thus, a memory space with a maximal size is usually reserved to avoid any failure for encoding/decoding point cloud data.

Thus, encoding/decoding a predictive tree of G-PCC according to the present invention may be less advantageous than when point cloud data is represented by coarse representation.

Figure 17:
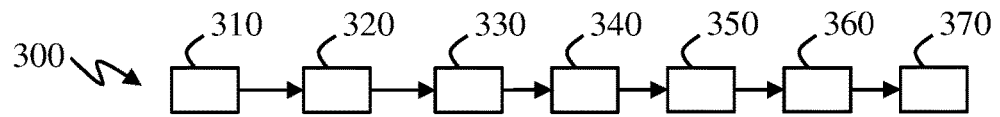
FIG. 17 shows a schematic block diagram of steps of a method 300 of encoding a slice of point cloud data into a bitstream in accordance with at least one embodiment.

FIG. 17 shows a schematic block diagram of steps of a method 300 of encoding a slice of point cloud data into a bitstream in accordance with at least one embodiment.

A coding state is represented by at least one coding parameter value, apart from data representative of the content of an entry of an entropy context table which is handled separately according to the enabling/disabling of the entropy continuation as previously discussed.

The at least one coding parameter value may be understood as the content of at least one variable (e.g. the content of a memory space) that is used and updated/modified in a similar way during the encoding and the decoding of a slice of point cloud data into/from the bitstream.

A coding state refers to a state of coding parameter values of the encoder 13 for encoding a slice of point cloud data into a bitstream and a same coding state of decoding parameter values of the decoder 14 for decoding said slice of point cloud data from the bitstream. The term "coding state" may then be used for both the encoding and decoding of a slice of point cloud data.

In step 310, a previous coding state represented by at least one coding parameter value used to previously encoding point cloud data (for example in a previous slice of point cloud data) is obtained, i.e. said at least one coding parameter, is obtained.

In one embodiment of step 310, the previous coding state may be obtained from a memory.

In step 320, a current coding state is initialized from the previous coding state. Thus, at least one coding parameter value representing the current coding state is initialized by at least one coding parameter value representing the previous coding state. The current coding state is then similar to the previous coding state.

In step 330, the slice of point cloud data is encoded into the bitstream B based on the current coding state, i.e. based on at least one coding parameter value representing the current coding state.

In one embodiment of step 330, the slice of point cloud data may be encoded according to the method 100 as described in relation with FIG. 14.

In step 340, the current coding state is updated during the encoding of the slice of point cloud data, according to encoded point cloud data obtained by encoding the slice of point cloud data.

Updating the current coding state, i.e. at least one coding parameter representing the current coding state, according to encoded point cloud data obtained by encoding the slice of point cloud data, may be provided by the regular updates of coding parameter values which are performed by the encoder during the encoding.

In step 350, the current coding state, i.e. at least one coding parameter value relative to the current coding state, is preserved during and/or at the end of the encoding of the slice of point cloud data.

In one embodiment of step 350, preserving the current coding state may comprise storing it in memory.

In variant of step 350, the current coding state, may be preserved after the last point cloud data of the slice of point cloud data has been encoded.

In variant of step 350, the current coding state may be preserved after a certain number of points of the slice of point cloud data have been encoded. In that case, the number of encoded points after which the current coding state is preserved may be predetermined, from a fixed value. For example, the fixed value may be encoded as a syntax element in a parameter set of the bitstream B, e.g. in a sequence parameter set, a geometry parameter set or a slice header/footer. Alternatively, the fixed value may be encoded or obtained from a number of points of a slice of point cloud (e.g. after half of the points have been encoded).

In variant of step 350, the current coding state may be preserved more than once during the encoding of a slice of point cloud data. In that case, the number of times and the number of encoded points after which the current coding state is preserved may be predetermined, from a fixed value.

For example, the fixed value may be encoded as a syntax element in a parameter set of the bitstream B, e.g. in a sequence parameter set, a geometry parameter set or a slice header/footer. Alternatively, the fixed value may be encoded or obtained from a number of points of a slice of point cloud (e.g. two times, one after half of the points have been encoded, and one after all the points have been encoded).

In one embodiment of the method 300, in step 360, an enabling data comprising an enabling restoring data indicating if steps 310 and 320 are executed or not may be obtained.

In variant, the enabling data may further comprise an enabling preserving data indicating if preserving (step 350) a current coding state is executed or not.

The current coding state is thus initialized by a previous coding state if the enabling data indicates that steps 310 and 320 are executed. Otherwise the current coding state is initialized by a default coding state represented by at least one default coding parameter value.

In variant of step 360, the encoder 13 may chose the value of the enabling data in order to optimize the coding efficiency of a slice of point cloud data, e.g. by minimize a rate-distortion function (cost).

In one embodiment of step 360, the enabling data may be deduced from at least one coding parameter value.

For example, the enabling data enables executing steps 310 and 320 for encoding a slice of point cloud data if the index of said slice of point cloud data is not divisible by a predetermined number, for example 10.

In one embodiment of step 360, the enabling data may be encoded into the bitstream B.

In one embodiment of the method 300, when the enabling data relative to a slice of point cloud to be encoded indicates that steps 310 and 320 are executed, in step 370, an initializing slice index referring to a preserved coding state of a slice of point cloud data previously encoded, may be obtained.

In one embodiment of step 370, the initializing slice index may be obtained from a memory.

In one embodiment of step 370, the initializing slice index may be deduced from previously encoded slice of point cloud data.

For example, the initializing slice index may refer to the lastly preserved coding state of a previously encoded slice of point cloud data.

In one embodiment of step 370, the initializing slice index relative to a slice of point cloud data may be encoded into the bitstream B as a syntax element of a slice header.

In variant of step 370, when the current coding state may be preserved more than once during the encoding of a slice of point cloud data, when the enabling data relative to a slice of point cloud to be encoded indicates that steps 310 and 320 are executed, in step 370, in addition to the initializing slice index, an initializing coding state index referring to a preserved coding state in a slice of point cloud data previously encoded, may be obtained.

In one embodiment of step 370, the initializing slice index and the initializing coding state index may be obtained from a memory.

In one embodiment of step 370, the initializing slice index and the initializing coding state index may be deduced from previously encoded slice of point cloud data and from point cloud data of the slice of point cloud data to be encoded.

For example, the initializing slice index and the initializing coding state index may refer to a previously preserved coding state of a previously encoded slice of point cloud data corresponding to a coding state at which the geometry information of the last encoded point cloud data was the closest, according to some metrics (for instance an angular distance between azimuthal angles) to the one of the first point cloud data to be coded.

In one embodiment of step 370, the initializing slice index relative to a slice of point cloud data and the initializing coding state index relative to a coding state preserved in that slice of point cloud data may be encoded into the bitstream B as two syntax elements of a slice header.

Figure 18:
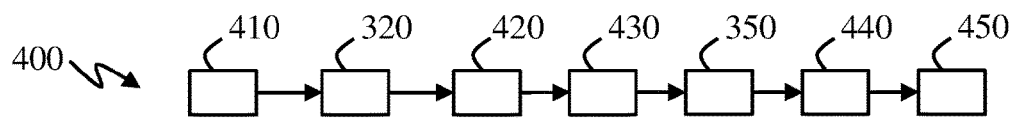
FIG. 18 shows a schematic block diagram of steps of a method 400 of decoding a slice of point cloud data into a bitstream in accordance with at least one embodiment.

FIG. 18 shows a schematic block diagram of steps of a method 400 of decoding a slice of point cloud data from a bitstream in accordance with at least one embodiment.

In step 410, a previous coding state represented by at least one coding parameter value used to previously decoding point cloud data (for example in a previous slice of point cloud data) is obtained.

In one embodiment of step 410, the previous coding state may be obtained from a memory.

In step 320, a current coding state is initialized from the previous coding state as above discussed.

In step 420, the slice of point cloud data is decoded from the bitstream B based on the current coding state, i.e. based on at least one coding parameter value representing the current coding state.

In one embodiment of step 420, the slice of point cloud data may be decoded according to the method 200 as described in relation with FIG. 15.

In step 430, the current coding state is updated during the decoding of the slice of point cloud data, according to decoded point cloud data obtained by decoding the slice of point cloud data.

Updating the current coding state, i.e. at least one coding parameter representing the current coding state, according to decoded point cloud data obtained by decoding the slice of point cloud data, may be provided by the regular updates of coding parameter values which are performed by the decoder during the decoding.

In step 350, the current coding state, i.e. at least one coding parameter value relative to the current coding state, is preserved during and/or at the end of the encoding of the slice of point cloud data.

In one embodiment of step 350, preserving the current coding state may comprise storing it in memory.

In variant of step 350, the current coding state, may be preserved after the last point cloud data of the slice of point cloud data has been decoded.

In variant of step 350, the current state may be preserved after a certain number of points of a slice of point cloud have been decoded. In that case, the number of decoded points after which the current coding state is preserved may be predetermined, from a fixed value. For example, the fixed value may be decoded from a syntax element in a parameter set of the bitstream B, e.g. in a sequence parameter set, a geometry parameter set or a slice header/footer. Alternatively, the fixed value may be decoded or obtained from the number of points in a slice of point cloud (e.g. after half of the points have been decoded).

In variant of step 350, the current coding state may be preserved more than once during the decoding of a slice of point cloud. In that case, the number of times and the number of decoded points after which the current coding state is preserved may be predetermined, from a fixed value. For example, the fixed value may be decoded as a syntax element in a parameter set of the bitstream B, e.g. in a sequence parameter set, a geometry parameter set or a slice header/footer. Alternatively, the fixed value may be decoded or obtained from a number of points of a slice of point cloud (e.g. two times, one after half of the points have been decoded, and one after all the points have been decoded).

In one embodiment of the method 400, in step 440, an enabling data comprising an enabling restoring data indicating if steps 410 and 320 are executed or not may be obtained.

In variant, the enabling data may further comprise an enabling preserving data indicating if preserving (step 350) a current coding state is executed or not.

The current coding state is thus initialized by a previous coding state if the enabling data indicates that the steps 410 and 320 are executed. Otherwise the current coding state is initialized by a default coding state represented by at least one default coding parameter value.

In one embodiment of step 440, the enabling data may be deduced from at least one coding parameter value.

For example, the enabling data enables executing the steps 410 and 320 for decoding a slice of point cloud data if the index of said slice of point cloud data is not divisible by a predetermined number, for example 10.

In one embodiment of step 440, the enabling data may be decoded from the bitstream B.

In one embodiment of the method 400, when the enabling data relative to a slice of point cloud to be decoded indicates that steps 410 and 320 are executed, in step 450, an initializing slice index referring to a preserved coding state of a slice of point cloud previously decoded may be obtained.

In one embodiment of step 450, the initializing slice index may be obtained from a memory.

In one embodiment of step 450, the initializing slice index may be deduced from previously decoded slice of point cloud data.

For example, the initializing slice index may refer to the lastly preserved coding state of a previously decoded slice of point cloud data.

In one embodiment of step 450, the initializing slice index relative to a slice of point cloud data may be decoded from the bitstream B as a syntax element of a slice header.

In variant of step 450, when the current coding state may be preserved more than once during the decoding of a slice of point cloud data, when the enabling data relative to a slice of point cloud to be decoded indicates that steps 410 and 320 are executed, in step 450, in addition to the initializing slice index, an initializing coding state index referring to a preserved coding state in a slice of point cloud data previously decoded, may be obtained.

In one embodiment of step 450, the initializing slice index and the initializing coding state index may be obtained from a memory.

In one embodiment of step 450, the initializing slice index and the initializing coding state index may be decoded from the bitstream B as two syntax elements of a slice header.

In variant of steps 370 and 450, the initializing slice index may be encoded/decoded into/from the bitstream B as a syntax element of a slice header only if the enabling data indicates that the steps 310 (410) and 320 are executed for encoding/decoding the slice of point cloud data.

In one embodiment of steps 360 and 440, the enabling data may comprise a binary value.

In one embodiment of steps 360 and 440, the enabling data may comprise an enabling preserving data which may be a binary value embedded in a syntax element of for instance a sequence parameter set, a geometry parameter set or an attribute parameter set of the bitstream B denoted for example preserve_coding_state_enabled_flag.

According to this embodiment, the enabling preserving data enables or disables preserving a coding state for a group of slices of point cloud data (for example the group of slices of point cloud data may include all the slices of point cloud data referring in their slice header to the parameter set in which the enabling preserving data is embedded). When preserving a coding state for a group of slices of point cloud data is enabled, executing 310 (410), 320 and 350 may be performed for all the slices of point cloud data to be encoded/decoded which belong to the group of slices.

In variant, the enabling restoring data may be assigned to each slice of point cloud data to be encoded/decoded and the enabling restoring data may comprise a binary value encoded/decoded into/from the bitstream B as a syntax element of a slice header denoted for example restore_coding_state_flag.

According to this variant, the enabling restoring data enables or disables for each slice of point cloud data the restoring of a coding state. Executing steps 310 (410) and 320 may be performed for each slice of point cloud data to be encoded/decoded for which the restoring of a coding state is enabled. Then, steps 310 (410) and 320 may be executed for encoding/decoding some slices of point cloud data and not executed for other.

In variant, the enabling data may comprise a second enabling preserving data which may be assigned to each slice of point cloud data to be encoded/decoded and the second enabling preserving data may comprise a binary value encoded/decoded into/from the bitstream as a syntax element of a slice header denoted for example per_laser_coding_state_preserved_enabled_flag or per_sensor_coding_state_preserved_enabled_flag.

According to this variant, the second enabling preserving data enables or disables for each slice of point cloud data the preserving a coding state. Executing the preserving of a coding state step 350 may be performed for each slice of point cloud data to be encoded/decoded for which the preserving a coding state is enabled. Then, the preserving of a coding state step 350 may be executed for encoding/decoding some slices of point cloud data and not executed for other.

In variant the enabling preserving data and/or the second enabling preserving data is/are assigned to each slice of point cloud data to be encoded/decoded only when the slice of point cloud data belongs to a group of slices for which the preserving a coding state for a group of slices is enabled.

In variant, the enabling restoring data is encoded/decoded into/from the bitstream B for a slice of point cloud data only if the entropy continuation is enabled for this slice of point cloud data. In case it is not enabled, the enabling restoring data is not encoded/decoded and is inferred as indicating that steps 310 and 320 are not executed.

In one embodiment of the methods 300 and 400, a coding state may be preserved independently to each other for each sensor of the sensor device 12.

In one embodiment of the methods 300 and 400, a coding state may be preserved independently for point cloud geometry coding parameters and for point cloud attribute coding parameters.

In a variant the enabling data may be applied independently for encoding/decoding point cloud geometry data and for point cloud attribute data.

In one embodiment of the methods 300 and 400, the current/previous coding state may be represented by an azimuthal angle $\phi_n$ (for spinning LiDAR sensor) or an index of a sensing time instant s (for parametric sensor device) of the last encoded or decoded point cloud data associated with a given sensor index $\lambda_n$, stored in a 1D array denoted lastPhiIndex[$\lambda_n$] for the given sensor index $\lambda_n$.

In one embodiment of the methods 300 and 400, the current/previous coding state may be represented by an index of an azimuthal angle $\phi_n$ (for spinning LiDAR sensor) or the index of the sensing time instant s (for parametric sensor device) of the last encoded or decoded point cloud data associated with the given sensor index $\lambda_n$ preceding last encoded point cloud data associated with the same sensor index $\lambda_n$, stored in an element of a 1D array denoted lastLastPhiIndex[$\lambda_n$] for the given sensor index $\lambda_n$.

In one embodiment of the methods 300 and 400, the current/previous coding state may be represented by a sign of a last non-null quantized radius residual encoded or decoded for a preceding encoded or decoded point cloud data associated with a given sensor index $\lambda_n$, stored in as element of a 1D array namely lastCodedSignR[$\lambda_n$] for the given sensor index $\lambda_n$. The element of the 1D array lastCodedSignR[$\lambda_n$] for a given sensor index $\lambda_n$ may be used to select entropy coding contexts which are used during the entropy encoding or decoding of a quantized radius residual relative to a point of the slice of point cloud data associated with the sensor index $\lambda_n$ (the next point to be encoded or decoded for example).

In one embodiment of the methods 300 and 400, the current/previous coding state may be represented by a sign of a last non-null quantized azimuthal angle residual (for example the quantized value of res($\phi$) in quantized angular residual Q3((res($\phi$), res($\theta$)))) encoded or decoded for a preceding encoded or decoded point cloud data associated with a given sensor index $\lambda_n$, stored in an element of a 1D array denoted lastCodedSignPhi[$\lambda_n$] for the given sensor index $\lambda_n$. The element of the 1D array lastCodedSignPhi[$\lambda_n$] for a given sensor index $\lambda_n$, may be used to select entropy coding contexts which are used during the entropy encoding or decoding of a residual of a prediction of a quantized azimuthal angle residual (for example the quantized value of res($\phi$) in quantized angular residual Q3((res($\phi$), res($\theta$)))) relative to a point of the slice of point cloud data associated with the sensor index $\lambda_n$ (the next point to be encoded or decoded for example).

In one embodiment of the methods 300 and 400, the current/previous coding state may be represented by a sign of a last non-null quantized Cartesian residual $z_{p,res}$ encoded or decoded for a preceding encoded or decoded point cloud data associated with a given sensor index $\lambda_n$, stored in an element of a 1D array denoted lastCodedSignZ[$\lambda_n$] for the given sensor index $\lambda_n$. The element of the 1D array lastCodedSignZ[$\lambda_n$] for a given sensor index $\lambda_n$ may be used to select entropy coding contexts which are used during the entropy encoding or decoding of a quantized Cartesian residual $z_{p,res}$ of a point of the slice of point cloud data associated with the sensor index $\lambda_n$, (the next point to be encoded or decoded for example).

In one embodiment of the methods 300 and 400, the current/previous coding state may be represented by a last radius predictor index in a list of radius predictors used for predicting the radius value of a last encoded or decoded point cloud data associated with a given sensor index $\lambda_n$, stored in an element of a 1D array denoted lastPredictorIndex[$\lambda_n$] for the given sensor index $\lambda_n$. The element of the 1D array lastPredictorIndex[$\lambda_n$] for a given sensor index $\lambda_n$, may be used to select entropy coding contexts which are used during the entropy encoding or decoding of a radius predictor index in a list of radius predictors used for predicting the radius value of a point of the slice of point cloud data associated with the sensor index $\lambda_n$, (the next point to be encoded or decoded for instance).

In one embodiment of the methods 300 and 400, the current/previous coding state may be represented by a dynamically maintained list of radius predictors, stored in an element of a 1D array denoted predictorBuffer[$\lambda_n$] for a given sensor index $\lambda_n$. The element of the 1D array predictorBuffer[$\lambda_n$] for a given sensor index $\lambda_n$, is a list from which a radius predictor index may be used to select a radius predictor and the radius predictor may be used to perform a prediction of a radius of a point of the slice of point cloud data associated with the sensor index $\lambda_n$, (the next point to be encoded or decoded for example).

In one embodiment of the methods 300 and 400, when point cloud data is represented by coarse representation, the current/previous coding state may be represented by at least one element of at least one of the 1D arrays lastPhiIndex [$\lambda_n$], lastLastPhiIndex[$\lambda_n$], lastCodedSignR[$\lambda_n$], lastCodedSignPhi[$\lambda_n$], lastCodedSignZ[$\lambda_n$], lastPredictorIndex[$\lambda_n$] and/or predictorBuffer[$\lambda_n$] for each sensor index $\lambda_n$.

In one embodiment of the methods 300 and 400, when point cloud data is represented by coarse representation, the current/previous coding state may be represented by each ones of the elements of each ones of the 1D arrays lastPhiIndex[$\lambda_n$], lastLastPhiIndex[$\lambda_n$], lastCodedSignR[$\lambda_n$], lastCodedSignPhi[$\lambda_n$], lastCodedSignZ[$\lambda_n$], lastPredictorIndex[$\lambda_n$] and/or predictorBuffer[$\lambda_n$] for each sensor index $\lambda_n$.

The elements of the 1D arrays lastPhiIndex [$\lambda_n$] and lastPredictorIndex [$\lambda_n$] for a given sensor index $\lambda_n$ are used to select entropy coding contexts which are used during the entropy encoding or decoding of a radius predictor index in a list of radius predictors chosen (by the encoder) for predicting a radius associated with a point associated with a given sensor index $\lambda_n$ (the next point to be encoded or decoded for example).

After point cloud data relative to a point of the slice of point cloud data has been encoded or decoded for a given sensor index $\lambda_n$, the element of the 1D array lastPhiIndex [$\lambda_n$] is used to update/set the element of the 1D array lastLastPhiIndex[$\lambda_n$] before being itself updated with an index associated with an azimuthal angle $\phi_n$ (for spinning LiDAR sensor) or an index of a sensing time instant s (for parametric sensor device) of point cloud data relative to the last encoded or decoded point of the slice of point cloud data for the given sensor index $\lambda_n$ (the one just encoded or decoded). The element of the 1D array lastCodedSignR[$\lambda_n$] is updated with the sign of the coded or decoded quantized radius residual, if the coded or decoded quantized radius residual is not null. The element of the array lastCodedSignPhi[$\lambda_n$] is updated with the sign of the coded or decoded quantized azimuthal angle residual, if the coded or decoded quantized azimuthal angle residual is not null. The element of the array lastCodedSignZ[$\lambda_n$] is updated with the sign of the coded or decoded quantized Cartesian residual $z_{p,res}$, if the coded or decoded quantized Cartesian residual $z_{p,res}$, is not null. The content element of the array lastPredictorIndex [$\lambda_n$] is updated with the coded or decoded radius predictor index in a list of radius predictors. The element of the array predictorBuffer[$\lambda_n$] content (i.e. the list of radius predictors), may be dynamically updated according to the coded or decoded radius predictor index in a list of radius predictors, and the reconstructed radius value $r_{p,rec}$. For instance, if the absolute value of the difference $r_{p,rec} - Pr_p$ is below a threshold (e.g. 4096), the element of the list with index equal to coded or decoded radius predictor index is moved to become the first element of the list, and the radius predictor $Pr_p$ of that element is set equal to $r_p$,rec; else, (i.e. the absolute value is above the threshold) the last element of the list of radius predictors is removed from the list, a new element in inserted to become the first element of the list, and the radius predictor $Pr_p$ of this new element is set equal to $r_{p,rec}$.

In L3C2, at the beginning of a slice of encoded or decoded point cloud data, the values of the azimuthal angle $\phi_n$ and the sensor index $\lambda_n$, are usually provided as raw data (without any compression nor prediction since there is no point to predict from). So, in variant of said last embodiment of the method 300 and 400, the coding state may also be represented by a binary value codingStarted indicating if point cloud data relative to points have already been encoded or decoded, and if point cloud data relative to points of the point cloud have already been encoded or decoded, the coding state may also be represented by a value lastPhiC representative of an azimuthal angle associated with the last encoded point and a value lastLambda representative of the sensor index relative to encoded or decoded point cloud data relative to the last point. Then, when the initialization step 320 is executed for encoding or decoding a slice of point cloud data, if the binary value codingStarted indicates that point cloud data relative to points have already been encoded or decoded, the encoding or decoding of the azimuthal angle and sensor index associated with point cloud data relative to the first point of said slice of point cloud data may benefit of the prediction from the values lastPhiC and lastLambdaC initialized in step 320 from a previous coding state (i.e. from a preceding slice). So, encoding point cloud data relative to said first point is similar to the encoding or decoding of point cloud data relative of any other point of the slice of point cloud data because an order index difference may be encoded or decoded for said first point.

For slices of point cloud data containing few points, this variant helps reducing the bitrate increase by several percent, especially when it is combined with entropy continuation.

Using this last embodiment and its variant of the method 300 and 400, in addition to entropy continuation, with slices containing points probed during 1 ms, 0.5 ms or 0.25 ms of sensing respectively (i.e. the slicing period is 1 ms, 0.5 ms, or 0.25 ms respectively), the bitstream size increase for compressed geometry data becomes about 2%, about 4% and about 8% respectively, which is by far better than using only entropy continuation (the bitstream size increase is reduced by around five sixth). This improvement can be explained by the fact that by preserving the prediction lists (contained in elements of the predictorBuffer), better prediction is obtained from the beginning of the slice of point cloud data; and also by the fact that preserving the other coding parameter values allows to select entropy coding contexts which are more suited to the point cloud data being encoded (quantized residuals and indexes) in comparison to if the coding parameter values were all initialized with default values. Default values generally provide inaccurate predictions, and so higher values of residuals to be encoded (and so bitrate overhead). Moreover, the higher residual values introduce biases in the entropy context tables, because of the probability updates made by the entropy encoding or decoding process, based on the higher residuals which are not representative of the residual that would be obtained once the prediction list is sufficiently populated. Also, selecting not suited context introduces biases in the entropy probabilities of the wrongly selected contexts.

In one embodiment of the methods 300 and 400, the current/previous coding state may be represented by a 1D array attrBuffer[$\lambda_n$] for each sensor index $\lambda_n$. The element of the 1D array attrBuffer[$\lambda_n$] for a given sensor index $\lambda_n$ is a buffer whose elements are computed from previously encoded or decoded point cloud attribute data relative to points of the point cloud that were associated with a given sensor index $\lambda_n$. These elements of the buffer contain data (apart from entropy coding probabilities) which may be used to perform attributes prediction and/or to select entropy coding contexts during encoding or decoding of point cloud attribute data representative of attributes associated with a point of the slice of point cloud data associated with a given sensor index $\lambda_n$.

In variant, an element attrBuffer[$\lambda_n$][1] with index I in the buffer contained in the element of the 1D array attrBuffer[$\lambda_n$] for a given sensor index $\lambda_n$ may represent a last encoded or decoded attribute value lastAttr[$\lambda_n$][1] for a point of the point cloud associated with the buffer element with index 1 during attributes encoding or decoding of a point associated with a given sensor index $\lambda_n$. The value lastAttr[$\lambda_n$][1] may be used for predicting encoded or decoded attribute value of a currently encoded or decoded point of the slice of point cloud data associated with a given sensor index $\lambda_n$ and associated with buffer element with index 1.

In variant, an element attrBuffer[$\lambda_n$][1] with index I in the buffer contained in the 1D array attrBuffer[$\lambda_n$] for a given sensor index $\lambda_n$ may represent a last encoded or decoded quantized residual of a predicted encoded or decoded attribute value lastlastAttrRes[$\lambda_n$][1] for a point of the point cloud associated with the buffer element with index 1 during attributes encoding or decoding of a point of the point cloud associated with a given sensor index $\lambda_n$ preceding the last encoded or decoded quantized residual of a predicted encoded or decoded attribute value lastAttr[$\lambda_n$][1] for a point of the point cloud associated with same buffer index 1 and same sensor index $\lambda_n$.

The value lastAttrRes[$\lambda_n$][1] is used to keep up to date the value of the element lastlastAttrRes[$\lambda_n$][1](i.e. its role is to buffer the value that will become later lastlastAttrRes[$\lambda_n$][1]).

In variant, an element attrBuffer[$\lambda_n$][1] with index I in the buffer contained in the 1D array attrBuffer[$\lambda_n$] for a given sensor index $\lambda_n$ may represent an encoded or decoded radius lastR[$\lambda_n$][1] of the last encoded or decoded point of the point cloud associated with the buffer element with index 1 during attributes encoding or decoding of a point of the slice of point cloud data associated with a given sensor index $\lambda_n$.

In variant, an element attrBuffer[$\lambda_n$][1] with index I in the buffer contained in the 1D array attrBuffer[$\lambda_n$] for a given sensor index $\lambda_n$ may represent a sign of a last non-null quantized residual of an encoded or decoded attribute value lastSign[$\lambda_n$][1] for a preceding point of the point cloud associated with the buffer element with index 1 during attributes encoding or decoding of a point of the point cloud associated with a given sensor index $\lambda_n$.

The variable lastR[$\lambda_n$][1] is used, at the beginning of the encoding or decoding of point cloud attribute data representative of attributes associated with a currently encoded or decoded point of the slice of point cloud data, to associate with the buffer element with index 1 the point of the slice of point cloud data associated with a given sensor index $\lambda_n$ that is being encoded or decoded. This association may be performed according to the minimum distance (L1 norm) between a reconstructed radius value of a currently encoded or decoded point of the slice of point cloud data and the values contained in each one of the variables lastR[$\lambda_n$][m] (with $\lambda_n$ fixed and m varying across possible indexes in the buffer).

The values lastlastAttrRes[$\lambda_n$][1] and lastSign[$\lambda_n$][1] may be used to select entropy contexts which are used during the entropy encoding or decoding of the quantized residual of a predicted encoded or decoded attribute value for a point associated with the buffer element with index 1 during attributes encoding or decoding of a point of the slice of point cloud data associated with a given sensor index $\lambda_n$.

In one embodiment of the methods 300 and 400, when point cloud data is represented by coarse representation, the current/previous coding state may be represented by at least one element of at least one the 1D arrays lastPhiIndex[$\lambda_n$], lastLastPhiIndex[$\lambda_n$], lastCodedSignR[$\lambda_n$], lastCodedSignPhi[$\lambda_n$], lastCodedSignZ[$\lambda_n$], lastPredictorIndex[$\lambda_n$], predictorBuffer[$\lambda_n$] and/or attrBuffer[$\lambda_n$] for each sensor index $\lambda_n$.

In one embodiment of the method 300 and 400, the slice of point cloud data may comprise point cloud geometry data.

In one embodiment of the method 300 and 400, the slice of point cloud data may comprise point cloud attribute data.

In one embodiment of the method 300 and 400, the slice of point cloud data may comprise point cloud geometry data and point cloud attribute data.

Figure 19:
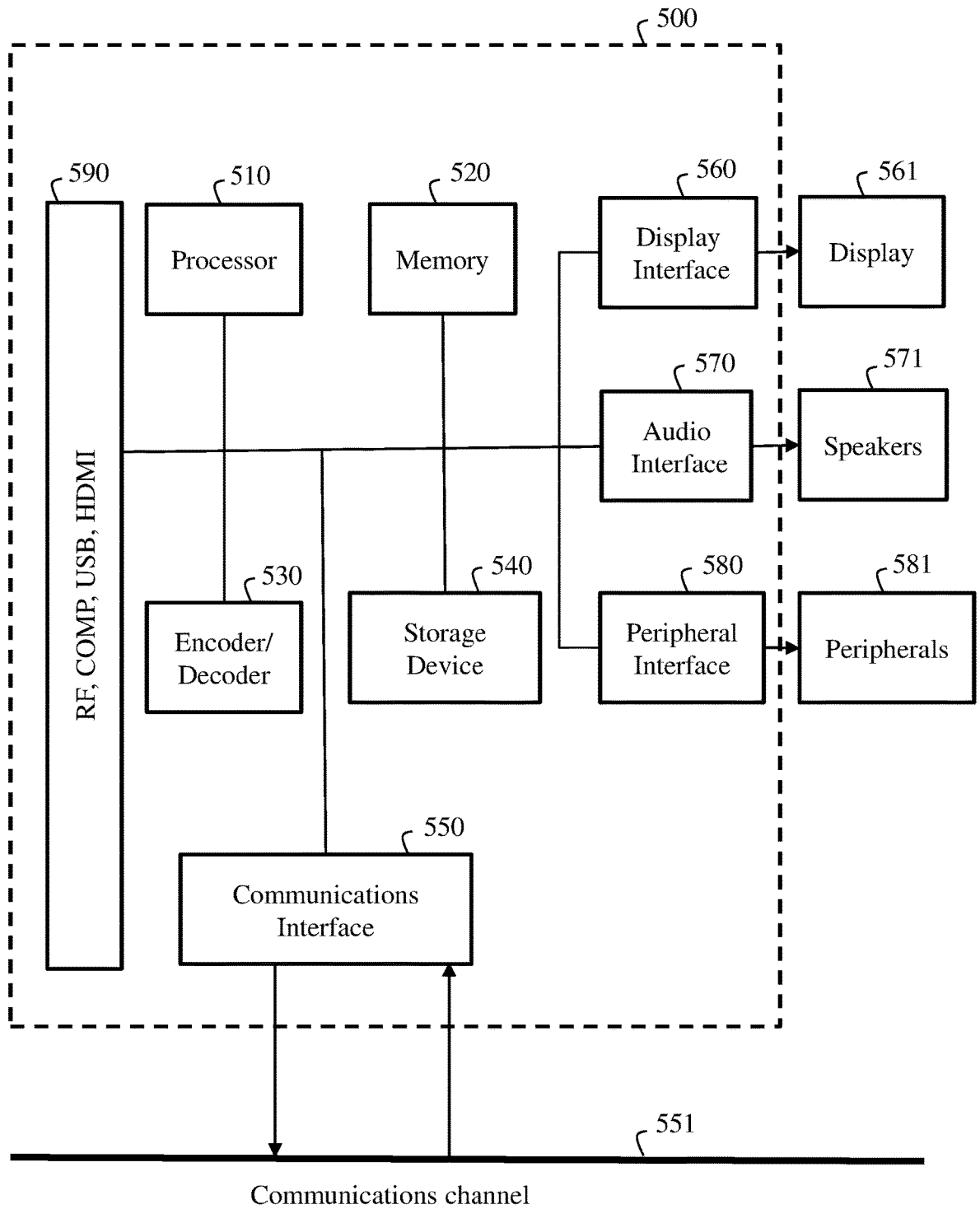
FIG. 19 illustrates a schematic block diagram of an example of a system in which various aspects and embodiments are implemented.

FIG. 19 shows a schematic block diagram illustrating an example of a system in which various aspects and embodiments are implemented.

System 500 may be embedded as one or more devices including the various components described below. In various embodiments, the system 500 may be configured to implement one or more of the aspects described in the present application.

Examples of equipment that may form all or part of the system 500 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 500, singly or in combination, may be embodied in a single integrated circuit (IC), multiple ICs, and/or discrete components. For example, in at least one embodiment, the processing and encoder/decoder elements of system 500 may be distributed across multiple ICs and/or discrete components. In various embodiments, the system 500 may be communicatively coupled to other similar systems, or to other electronic devices, via, for example, a communications bus or through dedicated input and/or output ports.

The system 500 may include at least one processor 510 configured to execute instructions loaded therein for implementing, for example, the various aspects described in the present application. Processor 510 may include embedded memory, input output interface, and various other circuitries as known in the art. The system 500 may include at least one memory 520 (for example a volatile memory device and/or a non-volatile memory device). System 500 may include a storage device 540, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 540 may include an internal storage device, an attached storage device, and/or a network accessible storage device, as non-limiting examples.

The system 500 may include an encoder/decoder module 530 configured, for example, to process data to provide encoded/decoded point cloud geometry data, and the encoder/decoder module 530 may include its own processor and memory. The encoder/decoder module 530 may represent module(s) that may be included in a device to perform the encoding and/or decoding functions. As is known, a device may include one or both encoding and decoding modules. Additionally, encoder/decoder module 530 may be implemented as a separate element of system 500 or may be incorporated within processor 510 as a combination of hardware and software as known to those skilled in the art.

Program code to be loaded onto processor 510 or encoder/decoder 530 to perform the various aspects described in the present application may be stored in storage device 540 and subsequently loaded onto memory 520 for execution by processor 510. In accordance with various embodiments, one or more of processor 510, memory 520, storage device 540, and encoder/decoder module 530 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 510 and/or the encoder/decoder module 530 may be used to store instructions and to provide working memory for processing that may be performed during encoding or decoding.

In other embodiments, however, a memory external to the processing device (for example, the processing device may be either the processor 510 or the encoder/decoder module 530) may be used for one or more of these functions. The external memory may be the memory 520 and/or the storage device 540, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 500 may be provided through various input devices as indicated in block 590. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present invention is implemented in the automotive domain.

In various embodiments, the input devices of block 590 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 500 to other electronic devices across USB and/or HDMI connections. It is to be understood that various aspects of input processing, for example, Reed-Solomon error correction, may be implemented, for example, within a separate input processing IC or within processor 510 as necessary. Similarly, aspects of USB or HDMI interface processing may be implemented within separate interface ICs or within processor 510 as necessary. The demodulated, error corrected, and demultiplexed stream may be provided to various processing elements, including, for example, processor 510, and encoder/decoder 530 operating in combination with the memory and storage elements to process the data stream as necessary for presentation on an output device.

Various elements of system 500 may be provided within an integrated housing. Within the integrated housing, the various elements may be interconnected and transmit data therebetween using suitable connection arrangement 590, for example, an internal bus as known in the art, including the I2C bus, wiring, and printed circuit boards.

The system 500 may include communication interface 550 that enables communication with other devices via communication channel 551. The communication interface 550 may include, but is not limited to, a transceiver configured to transmit and to receive data over communication channel 551. The communication interface 550 may include, but is not limited to, a modem or network card and the communication channel 551 may be implemented, for example, within a wired and/or a wireless medium.

Data may be streamed to the system 500, in various embodiments, using a Wi-Fi network such as IEEE 802.11. The Wi-Fi signal of these embodiments may be received over the communications channel 551 and the communications interface 550 which are adapted for Wi-Fi communications. The communications channel 551 of these embodiments may be typically connected to an access point or router that provides access to outside networks including the Internet for allowing streaming applications and other over-the-top communications.

Other embodiments may provide streamed data to the system 500 using a set-top box that delivers the data over the HDMI connection of the input block 590.

Still other embodiments may provide streamed data to the system 500 using the RF connection of the input block 590.

The streamed data may be used as a way for signaling information used by the system 500.

The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 500 may provide an output signal to various output devices, including a display 561, speakers 571, and other peripheral devices 581. The other peripheral devices 581 may include, in various examples of embodiments, one or more of a stand-alone DVR, a disk player, a stereo system, a lighting system, and other devices that provide a function based on the output of the system 500.

In various embodiments, control signals may be communicated between the system 500 and the display 561, speakers 571, or other peripheral devices 581 using signaling such as AV.Link (Audio/Video Link), CEC (Consumer Electronics Control), or other communications protocols that enable device-to-device control with or without user intervention.

The output devices may be communicatively coupled to system 500 via dedicated connections through respective interfaces 560, 570, and 580.

Alternatively, the output devices may be connected to system 500 using the communications channel 551 via the communications interface 550. The display 561 and speakers 571 may be integrated in a single unit with the other components of system 500 in an electronic device such as, for example, a television.

In various embodiments, the display interface 560 may include a display driver, such as, for example, a timing controller (T Con) chip.

The display 561 and speaker 571 may alternatively be separate from one or more of the other components, for example, if the RF portion of input 590 is part of a separate set-top box. In various embodiments in which the display 561 and speakers 571 may be external components, the output signal may be provided via dedicated output connections, including, for example, HDMI ports, USB ports, or COMP outputs.

In FIGS. 1-19, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts.

Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination.

Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 510 or by hardware, or by a combination of hardware and software. As a non-limiting example, the embodiments may be also implemented by one or more integrated circuits. The memory 520 may be of any type appropriate to the technical environment and may be implemented using any appropriate data storage technology, such as optical memory devices, magnetic memory devices, semiconductor-based memory devices, fixed memory, and removable memory, as non-limiting examples. The processor 510 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "obtaining" various pieces of information. Obtaining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving"θ is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a slice of point cloud data into a bitstream, comprising context-based entropy encoding the slice of point cloud data based on entropy context tables, wherein the method comprises:
    obtaining a previous coding state represented by at least one coding parameter value, apart from data representative of a content of an entry of one of the entropy context tables, used to previously encode point cloud data;
    initializing a current coding state from the previous coding state, the current coding state being represented by at least one current coding parameter;
    encoding the slice of point cloud data into the bitstream based on the current coding state;
    updating the current coding state during the encoding of the slice of point cloud data according to encoded point cloud data obtained by encoding the slice of point cloud data; and
    preserving the current coding state during and/or at the end of the encoding of the slice of point cloud data.

2. The method of claim 1, wherein the current coding state is preserved after last point cloud data of the slice of point cloud data has been encoded.

3. The method of claim 1, further comprising:
    obtaining enabling data comprising enabling restoring data indicating whether obtaining the previous coding state and initializing the current coding state are executed or not.

4. The method of claim 3, wherein the enabling data further comprises enabling preserving data indicating whether preserving the current coding state is executed or not.

5. The method of claim 3, wherein the enabling data is encoded into the bitstream.

6. The method of claim 5, wherein the enabling data comprises a binary value.

7. The method of claim 3, wherein the enabling restoring data is encoded into the bitstream for each slice of point cloud data to be encoded.

8. The method of claim 3, wherein when the enabling data indicates that obtaining the previous coding state and initializing the current coding state are executed, the method further comprises obtaining an initializing slice index referring to a preserved coding state of a slice of point cloud data previously encoded.

9. The method of claim 1, wherein the point cloud data comprises point cloud geometry and/or point cloud attribute data.

10. A method of decoding a slice of point cloud data from a bitstream, comprising context-based entropy decoding the slice of point cloud data based on entropy context tables, wherein the method comprises:
   obtaining a previous coding state represented by at least one coding parameter value, apart from data representative of the content of an entry of one of the entropy context tables, used to previously decode point cloud data;
   initializing a current coding state from the previous coding state, the current coding state being represented by at least one current coding parameter;
   decoding the slice of point cloud data from the bitstream based on the current coding state;
   updating the current coding state during the decoding of the slice of point cloud data according to decoded point cloud data obtained by decoding the slice of point cloud data; and
   preserving the current coding state during and/or at the end of the encoding of the slice of point cloud data.

11. The method of claim 10, wherein the current coding state is preserved after last point cloud data of the slice of point cloud data has been decoded.

12. The method of claim 10, further comprising: obtaining enabling data comprising enabling restoring data indicating whether obtaining the previous coding state and initializing the current coding state are executed or not.

13. The method of claim 12, wherein the enabling data further comprises enabling preserving data indicating whether preserving the current coding state is executed or not.

14. The method of claim 12, wherein the enabling data is decoded from the bitstream.

15. The method of claim 14, wherein the enabling data comprises a binary value.

16. The method of claim 12, wherein the enabling restoring data is decoded from the bitstream for each slice of point cloud data to be decoded.

17. The method of claim 12, wherein when the enabling data indicates that obtaining the previous coding state and initializing the current coding state are executed, the method further comprises obtaining an initializing slice index referring to a preserved coding state of a slice of point cloud data previously decoded.

18. The method of claim 10, wherein the point cloud data comprises point cloud geometry and/or point cloud attribute data.

19. A non-transitory storage medium carrying instructions of program code for executing the method of claim 10.

20. A non-transitory storage medium carrying instructions of program code for executing a method of encoding a slice of point cloud data into a bitstream comprising context-based entropy encoding the slice of point cloud data based on entropy context tables, wherein the method comprises:
   obtaining a previous coding state represented by at least one coding parameter value, apart from data representative of a content of an entry of one of the entropy context tables, used to previously encode point cloud data;
   initializing a current coding state from the previous coding state, the current coding state being represented by at least one current coding parameter;
   encoding the slice of point cloud data into the bitstream based on the current coding state;
   updating the current coding state during the encoding of the slice of point cloud data according to encoded point cloud data obtained by encoding the slice of point cloud data; and
   preserving the current coding state during and/or at the end of the encoding of the slice of point cloud data.

* * * * *